(12) United States Patent
Xiong et al.

(10) Patent No.: US 12,494,063 B2
(45) Date of Patent: Dec. 9, 2025

(54) SITE-BASED CALIBRATION OF OBJECT DETECTION RULES

(71) Applicant: Sandisk Technologies, Inc., Milpitas, CA (US)

(72) Inventors: Shaomin Xiong, Newark, CA (US); Toshiki Hirano, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 404 days.

(21) Appl. No.: 17/743,619

(22) Filed: May 13, 2022

(65) Prior Publication Data
US 2023/0368536 A1 Nov. 16, 2023

(51) Int. Cl.
| | |
|---|---|
| *G06V 20/52* | (2022.01) |
| *G06T 7/11* | (2017.01) |
| *G06T 7/70* | (2017.01) |
| *G06V 20/40* | (2022.01) |
| *H04N 5/77* | (2006.01) |
| *H04N 7/18* | (2006.01) |
| *H04N 17/00* | (2006.01) |

(52) U.S. Cl.
CPC ............... *G06V 20/52* (2022.01); *G06T 7/11* (2017.01); *G06T 7/70* (2017.01); *G06V 20/41* (2022.01); *G06V 20/49* (2022.01); *H04N 5/77* (2013.01); *H04N 7/183* (2013.01); *H04N 17/002* (2013.01); *G06T 2207/10016* (2013.01); *G06T 2207/20021* (2013.01); *G06T 2207/30232* (2013.01)

(58) Field of Classification Search
CPC ........ G06V 20/52; G06V 20/41; G06V 20/49; G06T 7/11; G06T 7/70; G06T 2207/10016; G06T 2207/20021; G06T 2207/30232; H04N 5/77; H04N 7/183; H04N 17/002
See application file for complete search history.

(56) References Cited

U.S. PATENT DOCUMENTS

| | | | |
|---|---|---|---|
| 7,391,907 B1 | 6/2008 | Venetianer et al. | |
| 7,932,923 B2 * | 4/2011 | Lipton | G06T 7/20 348/143 |
| 8,483,490 B2 * | 7/2013 | Brown | G06V 40/103 382/103 |
| 8,564,661 B2 * | 10/2013 | Lipton | G08B 13/19656 382/103 |
| 8,675,065 B2 | 3/2014 | Itoh et al. | |
| 8,711,217 B2 * | 4/2014 | Venetianer | G06F 16/7854 348/143 |
| 8,949,166 B2 * | 2/2015 | Nelke | G06N 5/025 706/47 |
| 9,077,716 B2 * | 7/2015 | Myers | H04L 63/10 |
| 9,230,336 B2 * | 1/2016 | Lewis | G06T 7/292 |
| 9,253,349 B2 * | 2/2016 | Amtrup | H04N 1/00251 |

(Continued)

*Primary Examiner* — Solomon G Bezuayehu
(74) *Attorney, Agent, or Firm* — Patent Law Works LLP

(57) ABSTRACT

Systems and methods for site-based calibration of object detection rules, such as for surveillance video cameras, are described. Video data from a video image sensor may be processed using an object detector to determine object data for a detected object. The object data may be post-processed using a post-processing rule set to determine whether the detected object violates the post-processing rule set. Event notifications to a video surveillance application may be prevented responsive to the object data violating the post-processing rule set.

20 Claims, 8 Drawing Sheets

(56) References Cited

U.S. PATENT DOCUMENTS

| | | | | |
|---|---|---|---|---|
| 9,336,451 B2* | 5/2016 | Boghossian | | H04N 7/181 |
| 10,127,445 B2 | 11/2018 | Saptharishi et al. | | |
| 10,169,661 B2* | 1/2019 | Bobbitt | | G06V 10/446 |
| 10,592,750 B1* | 3/2020 | Yavagal | | H04N 23/633 |
| 10,636,173 B1* | 4/2020 | Beach | | H04N 23/90 |
| 10,666,686 B1* | 5/2020 | Singh | | G06F 21/566 |
| 10,805,585 B2* | 10/2020 | Sodhi | | H04N 23/69 |
| 10,970,878 B2* | 4/2021 | Hess | | G06T 7/80 |
| 11,200,435 B1* | 12/2021 | Scanlon | | G05D 1/0094 |
| 11,263,899 B2* | 3/2022 | Ekin | | G06V 40/161 |
| 2006/0206724 A1* | 9/2006 | Schaufele | | G06F 21/32 |
| | | | | 726/16 |
| 2011/0102588 A1* | 5/2011 | Trundle | | G08B 13/1966 |
| | | | | 348/143 |
| 2012/0062732 A1* | 3/2012 | Marman | | G06T 7/277 |
| | | | | 348/142 |
| 2012/0271712 A1* | 10/2012 | Katzin | | G06Q 20/047 |
| | | | | 705/14.51 |
| 2013/0176430 A1* | 7/2013 | Zhu | | G06T 7/254 |
| | | | | 348/143 |
| 2015/0130934 A1* | 5/2015 | Carey | | H04N 7/183 |
| | | | | 348/143 |
| 2015/0138001 A1* | 5/2015 | Davies | | G08G 1/146 |
| | | | | 340/932.2 |
| 2016/0127699 A1* | 5/2016 | Yin | | G06T 7/11 |
| | | | | 348/143 |
| 2016/0165187 A1* | 6/2016 | Rasheed | | G06F 18/28 |
| | | | | 348/143 |
| 2017/0251182 A1* | 8/2017 | Siminoff | | G06T 7/70 |
| 2017/0287166 A1* | 10/2017 | Claveau | | G06T 7/80 |
| 2017/0322942 A1* | 11/2017 | Duda | | H04N 21/2353 |
| 2018/0232958 A1* | 8/2018 | Wang | | G06Q 20/42 |
| 2018/0233010 A1* | 8/2018 | Modestine | | H04N 7/186 |
| 2018/0285653 A1* | 10/2018 | Li | | G08B 25/08 |
| 2018/0295375 A1* | 10/2018 | Ratner | | G06T 7/12 |
| 2019/0370553 A1* | 12/2019 | Duan | | G06V 20/52 |
| 2020/0083979 A1* | 3/2020 | Roberts | | B64D 7/00 |
| 2021/0042531 A1* | 2/2021 | Zhang | | G06T 7/70 |
| 2021/0081956 A1* | 3/2021 | Tessier | | H04N 7/183 |
| 2021/0150235 A1* | 5/2021 | Meskimen | | G06Q 50/40 |
| 2021/0304537 A1* | 9/2021 | Reed | | G06F 18/22 |
| 2021/0357649 A1* | 11/2021 | Adam | | G06V 40/171 |
| 2021/0374430 A1* | 12/2021 | Siemer | | G06V 40/103 |
| 2022/0005586 A1* | 1/2022 | Brynolfsson | | G16H 30/40 |
| 2022/0180533 A1* | 6/2022 | Oami | | G06T 7/0002 |
| 2022/0300727 A1* | 9/2022 | Ehrlich | | G08B 21/18 |
| 2022/0374635 A1 | 11/2022 | Xiong et al. | | |
| 2022/0398848 A1* | 12/2022 | Bay | | G16H 40/20 |
| 2022/0414382 A1 | 12/2022 | Xiong et al. | | |
| 2023/0152652 A1* | 5/2023 | Trikha | | G06F 3/147 |
| | | | | 700/276 |
| 2023/0368536 A1* | 11/2023 | Xiong | | H04N 17/002 |

\* cited by examiner

SITE-BASED CALIBRATION OF OBJECT DETECTION RULES

TECHNICAL FIELD

The present disclosure generally relates to video surveillance systems and, more particularly, to calibration of video surveillance systems for object detection.

BACKGROUND

Network-based video surveillance systems are a growing computing application in both business and personal markets. Some video surveillance systems may include one or more video cameras communicatively connected to a server, such as a network video recorder, through a wired interface, wired or wireless local area network, or wired or wireless wide area network, such as the internet. As video is recorded by the cameras, it is forwarded to the server system where it is stored and/or analyzed for subsequent retrieval. Client or user systems are communicatively connected to the server system to request, receive, and display streams of recorded video data and/or related alerts and analytics.

An increasing number of video surveillance systems are using smart video cameras or otherwise moving compute resources and storage to edge devices in the system, rather than relying solely on a network video recorder appliance or cloud-based processing. For example, some video cameras may be configured with processors, memory, and storage resources far exceeding those needed to convert signals from video image and/or audio sensors into a desired video format for transmission to the network video recorder. However, even these increased compute resources may be limited by space, cost, and other considerations and are unlikely to match the compute resources available in a network video recorder, let alone cloud-based video processing servers.

It may be advantageous to perform real-time object detection processing of each video stream in a network-based surveillance system. However, the object detectors used for real-time video analysis may be less accurate than other object detection schemes, due to practical limitations on processing resources. Practical object detection models may still have an accuracy of less than 75%, which may include both missed detections and false alarms.

Systems and methods for improving the reliability or accuracy of object detectors in surveillance camera applications may be advantageous. A reliable and efficient way of calibrating rule sets for use by an individual camera installed in a camera location to reduce false alarms, particularly based on more easily detected "real world" conditions and logic, may be needed.

SUMMARY

Various aspects for calibration of logical rule sets based on the actual camera location for improving the accuracy of object detection events are described.

One general aspect includes a system including a video image sensor and a surveillance controller. The surveillance controller is configured to: receive video data from the video image sensor, where the video data includes a video stream of video frames captured by the video image sensor at a camera location; determine, using a field object detector, object data for a detected object in the video data; determine a post-processing rule set for the camera location; post-process, using the post-processing rule set, the object data to determine whether the detected object violates at least one rule from the post-processing rule set; and prevent, responsive to the detected object violating the at least one rule, an event notification to a video surveillance application.

Implementations may include one or more of the following features. The system may include a calibration controller configured to: receive, during a calibration period, video data from the video image sensor at the camera location; determine, based on the video data received during the calibration period, scene description parameters; and determine, based on the scene description parameters, a plurality of rules for the post-processing rule set. The system may include a video camera housing, where the video camera housing encloses the video image sensor, the surveillance controller, and a network interface configured to communicate with a network. The surveillance controller may be further configured to: send, to the calibration controller and over the network object data from the field object detector and video data from the video image sensor; and receive, from the calibration controller and over the network, the plurality of rules for the post-processing rule set. The calibration controller may be further configured to determine, based on the video data received during the calibration period, object data for at least one object in the video data. The scene description parameters may include the object data and at least one rule in the post-processing rule set may be based on the object data. The object data may include at least one of: an object class and an object attribute. The calibration controller may be further configured to evaluate, using the object data, a rules data store to determine at least one rule in the post-processing rule set. The calibration controller may be further configured to: segment a field of view of the video image sensor at the camera location into a plurality of regions; and determine, based on the video data, a region identifier for each region of the plurality of regions. The scene description parameters may include at least one region identifier and at least one rule in the post-processing rule set may be based on the at least one region identifier. The calibration controller may be further configured to determine a plurality of time periods for the camera location, and at least one rule in the post-processing rule set may be based on at least one time period of the plurality of time periods. The system may include a rule data store including a plurality of rule templates. Each rule template may include at least one selection index value and at least one rule comparator field. The calibration controller may be further configured to use at least one scene description parameter to index, in the rules data store, a selected rule template of the plurality of rule templates to determine at least one rule in the post-processing rule set. The at least one scene description parameter may indicate the at least one selection index value of the selected rule template. The at least one rule comparator field for each rule template of the plurality of rule templates may include at least one of: a region identifier value; a time value; an object class value; an object attribute value; and a location condition value. The surveillance controller may be further configured to: determine at least one location condition; and use the at least one location condition to post-process the object data to determine whether the detected object violates at least one rule from the post-processing rule set.

Another general aspect includes a computer-implemented method that includes: receiving video data from a video image sensor, where the video data includes a video stream of video frames captured by the video image sensor at a camera location; determining, using a field object detector, object data for a detected object in the video data; determining a post-processing rule set for the camera location;

post-processing, using the post-processing rule set, the object data to determine whether the detected object violates at least one rule from the post-processing rule set; and preventing, responsive to the detected object violating the at least one rule, an event notification to a video surveillance application.

Implementations may include one or more of the following features. The computer-implemented method may include: receiving, during a calibration period, video data from the video image sensor at the camera location; determining, based on the video data received during the calibration period, scene description parameters; and determining, based on the scene description parameters, a plurality of rules for the post-processing rule set. The computer-implemented method may include determining, based on the video data received during the calibration period, object data for at least one object in the video data, where the scene description parameters include the object data and at least one rule in the post-processing rule set is based on the object data. The computer-implemented method may include evaluating, using the object data, a rules data store to determine at least one rule in the post-processing rule set, where the object data includes at least one of: an object class and an object attribute. The computer-implemented method may include: segmenting a field of view of the video image sensor at the camera location into a plurality of regions; and determining, based on the video data, a region identifier to each region of the plurality of regions, where the scene description parameters include at least one region identifier and at least one rule in the post-processing rule set is based on the at least one region identifier. The computer-implemented method may include determining a plurality of time periods for the camera location, where at least one rule in the post-processing rule set is based on at least one time period of the plurality of time periods. The computer-implemented method may include using at least one scene description parameter to index a selected rule template of a plurality of rule templates to determine at least one rule in the post-processing rule set, where: each rule template of the plurality of rule templates includes at least one selection index value and at least one rule comparator field; and the at least one scene description parameter indicates the at least one selection index value of the selected rule template. The at least one rule comparator field for each rule template of the plurality of rule templates may include at least one of: a region identifier value; a time value; an object class value; an object attribute value; and a location condition value. The computer-implemented method may include: determining at least one location condition; and using the at least one location condition to post-process the object data to determine whether the detected object violates at least one rule from the post-processing rule set.

Still another general aspect includes a video camera that includes: a video image sensor; a processor; a memory; means for receiving video data from the video image sensor, where the video data includes a video stream of video frames captured by the video image sensor at a camera location; means for determining object data for a detected object in the video data; means for determining a post-processing rule set for the camera location; means for post-processing, using the post-processing rule set, the object data to determine whether the detected object violates at least one rule from the post-processing rule set; and means for preventing, responsive to the detected object violating the at least one rule, an event notification to a video surveillance application.

The various embodiments advantageously apply the teachings of computer-based surveillance systems to improve the functionality of such computer systems. The various embodiments include operations to overcome or at least reduce the issues previously encountered in surveillance systems and, accordingly, are more effective and/or cost-efficient than other surveillance systems. That is, the various embodiments disclosed herein include hardware and/or software with functionality to improve processing of video data by calibrating rules for post-processing the output of an object detector to increase object detection accuracy for the camera location and use. Accordingly, the embodiments disclosed herein provide various improvements to network-based video surveillance systems.

It should be understood that language used in the present disclosure has been principally selected for readability and instructional purposes, and not to limit the scope of the subject matter disclosed herein.

DETAILED DESCRIPTION

Figure 1:
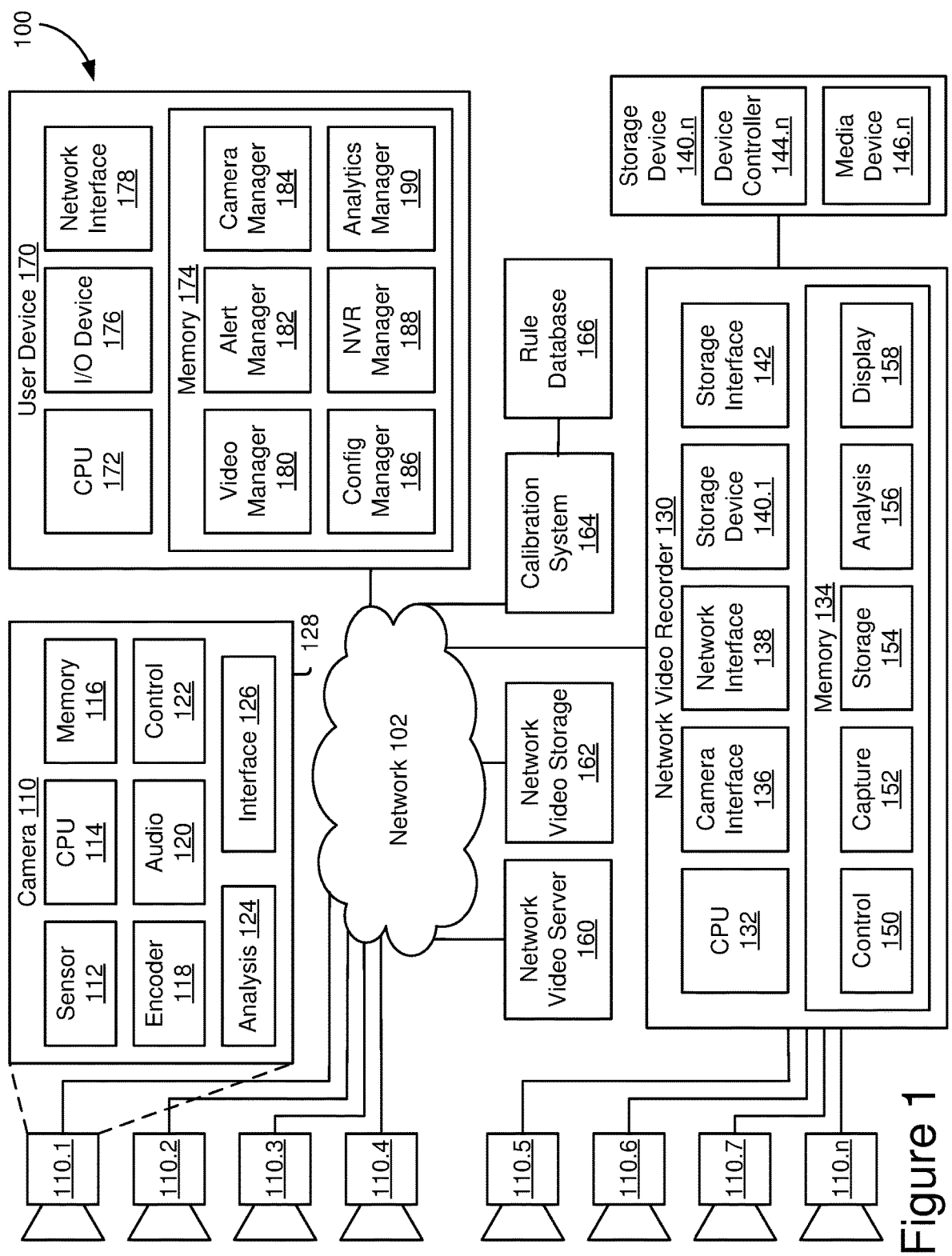
FIG. 1 schematically illustrates a computer-based surveillance system.

FIG. 1 shows an embodiment of an example video surveillance system 100 with multiple video cameras 110 interconnected to a network video recorder 130 for display of surveillance video on user device 170. While some example features are illustrated, various other features have not been illustrated for the sake of brevity and so as not to obscure pertinent aspects of the example embodiments disclosed herein. In some embodiments, cameras 110, network video recorder 130, and user device 170 are computer-based components that may be interconnected by a network 102. Additional components, such as network video server 160 and/or network video storage 162 may also be connected to network 102. In some embodiments, one or more cameras may connect directly to network video recorder 130, such as cameras 110.5-110.$n$ in FIG. 1, without communicating through network 102. Similarly, in alternate embodiments (not shown), user device 170 may connect directly to network video recorder 130.

In some embodiments, one or more networks 102 may be used to communicatively interconnect various components of surveillance system 100. For example, each component, such as cameras 110, network video recorder 130, external storage device 140.*n*, network video server 160, network video storage 162, calibration system 164, and/or user device 170 may include one or more network interfaces and corresponding network protocols for communication over network 102. Network 102 may include a wired and/or wireless network (e.g., public and/or private computer networks in any number and/or configuration) which may be coupled in a suitable way for transferring data. For example, network 102 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, network 102 may comprise a plurality of distinct networks, subnetworks, and/or virtual private networks (VPN) may be used to limit communications among specific components. For example, cameras 110 may be on a limited access network such that video and control data may only be transmitted between cameras 110 and network video recorder 130, enabling network video recorder 130 to control access to cameras 110 and their video data.

Cameras 110 may include analog or digital cameras connected to an encoder that generates an encoded video stream of time-dependent video frames with a defined resolution, aspect ratio, and video encoding format. In some embodiments, cameras 110 may include internet protocol (IP) cameras configured to encode their respective video streams and stream them over network 102 to network video recorder 130. In some embodiments (not shown), the encoder may reside in network video recorder 130. In some embodiments, cameras 110 may be configured to receive audio data through integrated or connected microphones (not shown) and include embedded and/or synchronized audio streams with their respective video streams. In some embodiments, video cameras 110 may include an image sensor 112, a processor (central processing unit (CPU), a neural processing unit, a vision processing unit, etc.) 114, a memory 116, an encoder 118, an audio channel 120, a control circuit 122, and/or a network interface 126. In some embodiments, video cameras 110 may include onboard analytics, such as a video analysis subsystem 124.

In some embodiments, the components of camera 110 may be configured in one or more processing systems or subsystems and/or printed circuit boards, chips, busses, etc. that are disposed or enclosed in a video camera housing 128. For example, image sensor 112, processor 114, memory 116, encoder 118, audio channel 120, control circuit 122, analysis subsystem 124, and/or a network interface 126 may comprise one or more application-specific integrated circuits (ASICs) mounted within a sealed plastic, metal, or similar housing with an aperture (often integrating a lens) for receiving light and one or more physical interconnects, such as a network port, for receiving power and communicatively coupling with other system components.

In some embodiments, image sensor 112 may include a solid state device configured to capture light waves and/or other electromagnetic waves and convert the light into an image, generally composed of colored pixels. Image sensor 112 may determine a base image size, resolution, bandwidth, depth of field, dynamic range, and other parameters of the video image frames captured. Image sensor 112 may include charged couple device (CCD), complementary metal oxide semiconductor (CMOS), and/or other image sensor devices of various sensor sizes and aspect ratios. In some embodiments, image sensor 112 may be paired with one or more filters, such as infrared (IR) blocking filters, for modifying the light received by image sensor 112 and/or processed by camera 110. For example, an IR blocking filter may be selectively enabled or disabled for different image capture use cases. In some embodiments, one or more video cameras 110 may include more than one image sensor and related video data paths. For example, video camera 110 may include two image sensors, associated lenses, and data paths to the encoding and processing components in video camera 110. In some embodiments, multiple image sensors are supported by the same circuit board and/or processing subsystem containing processor 114, memory 116, encoder 118, audio channel 120, control circuit 122, analysis subsystem 124, and/or network interface 126.

Digital video data from image sensor 112 may be received by processor 114 for (temporary) storage and processing in memory 116 and/or encoding by encoder 118. Processor 114 may include any type of conventional processor or microprocessor that interprets and executes instructions. In some embodiments, processor 114 may include a neural network processor, such as a neural network processor used by analysis subsystem 124 for supporting object recognition or other onboard analysis. Memory 116 may include a random access memory (RAM) or another type of dynamic storage device that stores information and instructions for execution by processor 114 and/or a read only memory (ROM) or another type of static storage device that stores static information and instructions for use by processor 114 and/or any suitable storage element such as a solid state storage element. Memory 116 may store basic input/output system (BIOS), firmware, and/or operating system instructions for initializing and executing the instructions and processes of cameras 110. Encoder 118 may use various possible digital encoding and/or compression formats for encoding the video data generated by image sensor 112 into a time-dependent video stream composed of video frames at a determined frame rate (number of frames per second). In some embodiments, encoder 118 may use a compressed video format to reduce the storage size and network bandwidth necessary for storing and transferring the original video stream. For example, encoder 118 may be configured to encode the video data as joint photographic expert group (JPEG), motion picture expert group (MPEG)-2, MPEG-4, advanced video coding (AVC)/H.264, and/or other video encoding standards or proprietary formats.

Camera 110 may include audio channel 120 configured to capture audio data to be processed and encoded with image data in the resulting video stream. In some embodiments, one or more microphones may be selectively enabled to capture audio data in parallel with the image data captured by image sensor 112. For example, microphone may be configured with an audio sensor that captures sound waves and converts them into a time-based audio data stream. In some embodiments, encoder 118 may include an audio encoder that operates in conjunction with the video encoder to encode a synchronized audio data stream in the video stream. For example, the video format used to by encoder 118 may include one or more audio tracks for encoding audio data to accompany the image data during video stream playback.

Control circuit 122 may include a control circuit for managing the physical position of a camera 110. In some embodiments, camera 110 may be a pan-tilt-zoom (PTZ) camera that is capable of remote directional and zoom control. Control circuit 122 may be configured to receive motion commands through network interface 126 and/or through another interface, such as a dedicated remote-control interface, such short distance infrared signals, Bluetooth, etc. For example, network video recorder 130 and/or user device 170 may be configured to send PTZ commands to control circuit 122, which translates those commands into motor position control signals for a plurality of actuators that control the position of camera 110. In some embodiments, control circuit 122 may include logic for automatically responding to movement or other triggers detected through image sensor 112 to redirect camera 110 toward the source of movement or other trigger. For example, an auto tracking feature may be embodied in firmware that enables the camera to estimate the size and position of an object based on changes in the pixels in the raw video stream from image sensor 112 and adjust the position of the camera to follow the moving object, returning to a default position when movement is no longer detected. Similarly, an auto capture feature may be embodied in firmware that enables the camera to determine and bound an object based on an object detection algorithm and center and zoom on that object to improve image size and quality. In some embodiments, control circuit 122 may include logic for virtual PTZ or ePTZ, which enables a high-resolution camera to digitally zoom and pan to portions of the image collected by image sensor 112, with no physical movement of the camera. In some embodiments, control circuit 122 may include software and one or more application protocol interfaces (APIs) for enabling remote devices to control additional features and capabilities of camera 110. For example, control circuit 122 may enable network video recorder 130, another video camera 110, and/or user device 170 to configure video formats, enable and disable filters, set motion detection, auto tracking, and similar features, and/or initiate video data streaming. In some embodiments, one or more systems may provide PTZ position control signals (and/or PTZ positioning commands converted to PTZ position control signals by control circuit 122) through the API.

In some embodiments, video camera 110 may include video analysis subsystem 124 configured for onboard video analytics. For example, video analysis subsystem 124 may be configured to use processor 114 and memory 116 to execute at least a portion of video analytics for video data captured by video camera 110. In some embodiments, video analysis subsystem 124 may be configured to operate similarly to video analysis subsystem 156 in network video recorder 130, as further described below, and embody one or more analytics engines and/or analytical model libraries. In some embodiments, video analysis subsystem 124 may be configured to support real-time object detection within camera 110 without processing support from network video recorder 130 or network video server 160. For example, video analysis subsystem 124 may receive a video stream (from sensor 112 and/or encoder 118), initiate an object detector to determine whether an object of interest is present in the video data and, if so, return the object's position within the video frame, and post-process the data from the object detector to determine whether an object detection event should be raised to other components in the system.

Network interface 126 may include one or more wired or wireless connections to network 102 and/or a dedicated camera interface of network video recorder 130. For example, network interface 126 may include an ethernet jack and corresponding protocols for IP communication with network video recorder 130. In some embodiments, network interface 126 may include a power over ethernet (POE) connection with network video recorder 130 or another camera access point. PoE may enable both power for camera 110 and network data to travel on the same wire. In some embodiments, network interface 126 may enable an IP camera to be configured as a network resource with an IP address that is accessible on a LAN, WAN, or the internet. For example, network video recorder 130 and/or user device 170 may be configured to selectively receive video from cameras 110 from any internet-connected location using internet addressing and security protocols.

Network video recorder 130 may include a computer system configured as a video storage device to record the video streams from cameras 110. For example, network video recorder 130 may be configured to receive video streams from each of cameras 110 for storage, analysis, and/or display through user device 170. In some embodiments, cameras 110 may send encoded video streams based on the raw image data collected from their respective image sensors 112, with or without video data compression. A single video stream may be received from each camera 110 and network video recorder 130 may be configured to receive video streams from all connected cameras in parallel, as network bandwidth and processing resources allow.

Network video recorder 130 may include a housing and a bus interconnecting at least one processor 132, at least one memory 134, at least one storage device 140, and at least one interface, such as camera interface 136, network interface 138, and/or storage interface 142. The housing (not shown) may include an enclosure for mounting the various subcomponents of network video recorder 130, locating any physical connectors for the interfaces, and protecting the subcomponents. Some housings may be configured for mounting within a rack system. The bus (not shown) may include one or more conductors that permit communication among the components of network video recorder 130. Processor 132 may include any type of processor or microprocessor that interprets and executes instructions or operations. Memory 134 may include a random access memory (RAM) or another type of dynamic storage device that stores information and instructions for execution by processor 132 and/or a read only memory (ROM) or another type of static storage device that stores static information and instructions for use by processor 132 and/or any suitable storage element.

In some embodiments, network video recorder 130 may include camera interface 136 configured for connection with one or more cameras 110. For example, camera interface 136 may include a plurality of ethernet ports and supporting protocols compatible with PoE standards for connecting to cameras 110.5-110.n. In some embodiments, camera interface 136 may include a PoE network switch for providing power to connected cameras and routing data packets to and from cameras 110.5-110.n, such as control and video data. In some embodiments, network video recorder 130 may not include a dedicated camera interface 136 and may use network interface 138 for communication with cameras 110 over network 102.

Network interface 138 may include one or more wired or wireless network connections to network 102. Network interface 138 may include a physical interface, such as an ethernet port, and related hardware and software protocols for communication over network 102, such as a network interface card.

Storage devices 140 may include one or more non-volatile memory devices configured to store video data, such as a hard disk drive (HDD), solid state drive (SSD), flash memory-based removable storage (e.g., secure data (SD) card), embedded memory chips, etc. In some embodiments, storage device 140 is, or includes, a plurality of solid-state drives. In some embodiments, network video recorder 130 may include internal storage device 140.1 and expandable storage that enables additional storage devices 140.*n* to be connected via storage interface 142. Each storage device 140 may include a non-volatile memory (NVM) or device controller 144 based on compute resources (processor and memory) and a plurality of NVM or media devices 146 for data storage (e.g., one or more NVM device(s), such as one or more flash memory devices). In some embodiments, a respective data storage device 140 of the one or more data storage devices includes one or more NVM controllers, such as flash controllers or channel controllers (e.g., for storage devices having NVM devices in multiple memory channels). In some embodiments, storage devices 140 may each be packaged in a housing, such as a multi-part sealed housing with a defined form factor and ports and/or connectors for interconnecting with storage interface 142. Storage device 140.1 and each expanded storage devices 140.*n* may be of the same storage device type or a different storage device type.

In some embodiments, a respective data storage device 140 may include a single medium device, while in other embodiments the respective data storage device 140 includes a plurality of media devices. In some embodiments, media devices include NAND-type flash memory or NOR-type flash memory. In some embodiments, storage device 140 may include one or more hard disk drives. In some embodiments, storage devices 140 may include a flash memory device, which in turn includes one or more flash memory die, one or more flash memory packages, one or more flash memory channels or the like. However, in some embodiments, one or more of the data storage devices 140 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 140 includes a device controller 144, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 146 are coupled to device controllers 144 through connections that typically convey commands in addition to data, and optionally convey metadata, error correction information and/or other information in addition to data values to be stored in media devices and data values read from media devices 146. Media devices 146 may include any number (i.e., one or more) of memory devices including, without limitation, non-volatile semiconductor memory devices, such as flash memory device(s). In some embodiments, media devices 146 may include NAND or NOR flash memory devices comprised of single level cells (SLC), multiple level cell (MLC), triple-level cells, or more.

In some embodiments, media devices 146 in storage devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 140, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, video media files, or other logical data constructs composed of multiple host blocks. In some embodiments, storage device 140 may be configured specifically for managing the storage and overwriting of video data in a continual monitoring application for video surveillance.

Storage interface 142 may include a physical interface for connecting to one or more external storage devices using an interface protocol that supports storage device access. For example, storage interface 142 may include a peripheral component interconnect express (PCIe), serial advanced technology attachment (SATA), small computer system interface (SCSI), serial attached SCSI (SAS), universal serial bus (USB), Firewire, or similar storage interface connector supporting storage protocol access to storage devices 140.*n*. In some embodiments, storage interface 142 may include a wireless data connection with sufficient bandwidth for video data transfer. Depending on the configuration and protocols used by storage interface 142, storage device 140.*n* may include a corresponding interface adapter, firmware, and/or protocols for receiving, managing, and responding to storage commands from network video recorder 130.

Network video recorder 130 may include a plurality of modules or subsystems that are stored and/or instantiated in memory 134 for execution by processor 132 as instructions or operations. For example, memory 134 may include a camera control subsystem 150 configured to control cameras 110. Memory 134 may include a video capture subsystem 152 configured to receive video streams from cameras 110. Memory 134 may include a video storage subsystem 154 configured to store received video data in storage device(s) 140 and/or network video storage 162. Memory 134 may include a video analysis subsystem configured to analyze video streams and/or video data for defined events, such as motion, recognized objects, recognized faces, and combinations thereof. Memory 134 may include a video display subsystem configured to selectively display video streams on user device 170, which may be attached to network video recorder 130 or remotely connected via network 102. In some embodiments, the functions of calibration system 164 may be integrated in network video recorder 130 and instantiated in memory 134 as a calibration subsystem and/or a subset of functions of analysis subsystem 156.

In some embodiments, camera control subsystem 150 may include interface protocols and a set of functions and parameters for using, configuring, communicating with, and providing command messages to cameras 110. For example, camera control subsystem 150 may include an API and command set for interacting with control circuit 122 to access one or more camera functions. In some embodiments, camera control subsystem 150 may be configured to set video configuration parameters for image sensor 112 and/or video encoder 118, access pan-tilt-zoom features of control circuit 122, set or modify camera-based motion detection, tripwire, and/or low light detection parameters in memory 116, and/or otherwise manage operation of cameras 110. For example, camera control subsystem 150 may maintain a video camera configuration table, pages, or similar data structures that includes entries for each video camera being managed and their respective camera-specific configuration parameters, active control features (such as PTZ control), and other configuration and control information for managing cameras 110. In some embodiments, each camera 110 may be assigned a unique camera identifier that may be used by camera control subsystem 150, video capture subsystem 152, and/or other subsystems to associate video data with the camera from which it was received.

In some embodiments, video capture subsystem 152 may include interface protocols and a set of functions and parameters for receiving video streams from cameras 110. For example, video capture subsystem 152 may include video data channels and related data buffers for managing a plurality of camera video data streams. In some embodiments, each video camera 110 may be allocated a dedicated video channel for continuously and/or selectively sending its video stream to network video recorder 130. Video capture subsystem 152 may be configured to pass each received video stream to video storage subsystem 154, video analysis subsystem 156, and/or video display subsystem 158.

In some embodiments, video storage subsystem 154 may include interface protocols and a set of functions and parameters for managing storage of video data in storage devices 140 and/or network video storage 162 for later retrieval and use by video analysis subsystem 156 and/or video display subsystem 158. For example, video storage subsystem 154 may write camera video stream data from video data buffers to non-volatile storage in storage devices 140 and video analysis subsystem 156 and/or video display subsystem 158 may be configured to selectively read video data from storage devices 140. In some embodiments, video storage subsystem 154 may include management of video storage space in storage devices 140 and/or network video storage 162 in accordance with one or more data retention and/or data archiving schemes. For example, surveillance system 100 may support continuous and/or triggered recording of video data from cameras 110 and video storage subsystem 154 may include logic for enforcing a data retention and overwriting policy whereby the fixed storage space of storage devices 140 is recycled for storing a recent period of captured video, video data meeting specific retention criteria, and/or deleting or archiving video data after one or more periods of time defined in the data retention policy. In some embodiments, video storage subsystem 154 may include or access video decoders and/or encoders for storing video data in a storage video format that is different than the camera video format, such as using a different codec, compression factor, frame rate, resolution, image size, etc.

In some embodiments, video analysis subsystem 156 may include interface protocols and a set of functions and parameters for analyzing video data from cameras 110. For example, video analysis subsystem 156 may be configured to run one or more event detection algorithms for determining, tagging, and/or initiating alerts or other actions in response to detected video events. In some embodiments, video analysis subsystem 156 may be configured to tag or build metadata structures that map detected events to time and image location markers for the video stream from which they are detected. For example, video analysis subsystem 156 may use motion, tripwire, object recognition, facial recognition, audio detection, speech recognition, and/or other algorithms to determine events occurring in a video stream and tag them in a corresponding metadata track and/or separate metadata table associated with the video data object. In some embodiments, video analysis subsystem 156 may include event handling logic for determining response to detection of one or more detected events or objects, such as raising an alert to user device 170 or triggering selective display of a video stream including the detected event through video display subsystem 158. In some embodiments, video analysis subsystem 156 may operate in real-time or near real-time on video data received by video capture subsystem 152, delayed processing of video data stored by video storage subsystem 154, and/or a combination thereof based on the nature (and processing requirements) of the video events, volume of video to be processed, and other factors. In some embodiments, video analysis subsystem 156 may comprise one or more analytics engines configured for a particular type of event and corresponding event detection algorithm or model.

In some embodiments, video display subsystem 158 may include interface protocols and a set of functions and parameters for displaying video from video capture subsystem 152 and/or video storage subsystem 154 on user device 170. For example, video display subsystem 158 may include a monitoring or display configuration for displaying one or more video streams in real-time or near real-time on a graphical user display of user device 170 and/or receive video navigation commands from user device 170 to selectively display stored video data from video storage subsystem 154. In some embodiments, video display subsystem 158 may maintain an index of real-time/near real-time video streams and/or stored or archived video streams that are available for access by user device 170. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Video display subsystem 158 may be configured to support user device 170 when directly attached to network video recorder 130 and/or via network 102 within a LAN, WAN, VPN, or the internet.

In some embodiments, surveillance system 100 may include one or more remote and/or cloud-based resources for supporting the functions of network video recorder 130 and/or user device 170. For example, surveillance system 100 may include a network video server 160 configured to host some, all, or select portions of the functions of network video recorder 130, such as a cloud-based server system or video surveillance as a service (VSaaS) server. As another example, surveillance system 100 may include network video storage 162 for storing active and/or archived video data, supplementing and/or replacing storage devices 140, such as a cloud-based network attached storage system or distributed storage system. In some embodiments, the majority of functions described above for network video recorder 130 may reside in network video recorder 130 and select functions may be configured to leverage additional resources in network video server 160 and/or network video storage 162. For example, network video server 160 may be configured to support specialized and/or processing intensive event detection algorithms to supplement video analysis subsystem 156 and/or network video storage 162 may be configured to support archiving of inactive video data for longer term storage.

In some embodiments, surveillance system 100 may include one or more calibration systems 164 for enabling calibration of post-processing rule sets for output data from real-time or field object detectors, such as object detectors in analysis subsystem 124 of cameras 110 or analysis subsystem 156 of network video recorder 130. In some embodiments, a similar calibration system may be used for VSaaS services and/or analysis of stored video data. In some embodiments, calibration system 164 may be temporarily connected to surveillance system 100 during a calibration stage and disconnected during normal operation of surveillance system 100. For example, a separate computing device hosting a calibration controller may be connected to surveillance system 100 through network 102, network video recorder 130, and/or cameras 110. In some embodiments, calibration system 164 may be instantiated in network video recorder 130, network video server 160, and/or user device 170 to provide calibration support during a calibration stage or on a periodic basis. In some embodiments, calibration system 164 may include a processor, memory, input/output (I/O) devices, network interface, and/or other compute resources instantiating and/or supporting a calibration controller and/or functions described therein, as further described below. In some embodiments, calibration system 164 may incorporate compute resources, such as specialized processors and memory configurations, for supporting heavy weight object detection, motion, tracking, and/or classification models that could not practically be implemented by other system components, particularly cameras 110.

In some embodiments, calibration system 164 may be supported by a rule database 166 configured to aggregate logical rules and/or logical rule templates across many cameras, installations, locations, use-cases, and scene types. For example, a surveillance system manufacturer or VSaaS service provide may aggregate sample video data from customers to develop rules database 166 through a combination of automated and manual analysis. Rules database 166 may enable customized post-processing rule sets to be deployed for site-based post-processing of detected object. For example, objects that may be falsely detected by a trained machine learning model may be excluded for violating specific logical rules, such as cars should not be detected in a region of the video frame corresponding to the ceiling of a room or a cat should not be detected that has a bounding box the size of a car. Rules database 166 may provide a large-scale knowledgebase that can be searched to selectively deploy post-processing rule sets appropriate to the actual camera location and view.

User device 170 may be any suitable computer device, such as a computer, a computer server, a laptop computer, a tablet device, a netbook, an internet kiosk, a personal digital assistant, a mobile phone, a smart phone, a gaming device, or any other computing device. User device 170 is sometimes called a host, client, or client system. In some embodiments, user device 170 may host or instantiate one or more applications for interfacing with surveillance system 100. For example, user device 170 may be a personal computer or mobile device running a surveillance monitoring and management application configured to provide a user interface for network video recorder 130. In some embodiments, user device 170 may be configured to access cameras 110 and/or their respective video streams through network video recorder 130 and/or directly through network 102. In some embodiments, one or more functions of network video recorder 130 may be instantiated in user device 170 and/or one or more functions of user device 170 may be instantiated in network video recorder 130.

User device 170 may include one or more processors 172 for executing compute operations or instructions stored in memory 174 for accessing video data and other functions of network video recorder 130 through network 102. In some embodiments, processor 172 may be associated with memory 174 and input/output device 176 for executing both video display operations and surveillance system management operations. Processor 172 may include any type of processor or microprocessor that interprets and executes instructions or operations. Memory 174 may include a random access memory (RAM) or another type of dynamic storage device that stores information and instructions for execution by processor 172 and/or a read only memory (ROM) or another type of static storage device that stores static information and instructions for use by processor 172 and/or any suitable storage element. In some embodiments, user device 170 may allocate a portion of memory 174 and/or another local storage device (in or attached to user device 170) for storing selected video data for user device 170. In some embodiments, user device 170 may include one or more input/output (I/O) devices 176. For example, a graphical display, such as a monitor and/or touch screen display, and/or other user interface components such as a keyboard, a mouse, function buttons, speakers, vibration motor, a track-pad, a pen, voice recognition, biometric mechanisms, and/or any number of supplemental devices to add functionality to user device 170. Network interface 178 may include one or more wired or wireless network connections to network 102. Network interface 178 may include a physical interface, such as an ethernet port, and/or related hardware and software protocols for communication over network 102, such as a network interface card, wireless network adapter, and/or cellular data interface.

User device 170 may include a plurality of modules or subsystems that are stored and/or instantiated in memory 174 for execution by processor 172 as instructions or operations. For example, memory 174 may include a video manager 180 configured to provide a user interface for selectively navigating and displaying real-time, near real-time, and/or stored video streams. Memory 174 may include alert manager 182 configured to provide a user interface for setting, monitoring, and displaying alerts based on video events. Memory 174 may include a camera manager 184 configured to provide a user interface for identifying, configuring, and managing cameras 110. Memory 174 may include a configuration manager 186 to provide a user interface for setting and managing system settings, user access controls, storage options, and other configuration settings for surveillance system 100. Memory 174 may include a network video recorder manager 188 configured to provide a user interface for identifying, configuring, and managing network video recorder 130 and/or multiple network video recorders. Memory 174 may include an analytics manager configured to provide a user interface for selecting, training, and managing event detection algorithms for surveillance system 100.

In some embodiments, video manager 180 may include interface protocols and a set of functions and parameters for navigating and displaying video streams from cameras 110. For example, video manager 180 may include a graphical user interface and interactive controls for displaying lists, tables, thumbnails, or similar interface elements for selecting and displaying video streams for particular cameras, times, locations, and/or events. In some embodiments, video manager 180 may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, video manager 180 may include a data structure summarizing all video data stored in surveillance system 100 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.). In some embodiments, video manager 180 may be configured to interface with video display subsystem 158 and/or storage subsystem 154 for determining and retrieving selected video data.

In some embodiments, alert manager 182 may include interface protocols and a set of functions and parameters for setting, monitoring, and displaying alerts based on video events. For example, the user may define a set of trigger events that generate visual, audible, tactile, and/or notification-based (electronic mail, text message, automated call, etc.) alert to user device 170. In some embodiments, alert manager 182 may include a plurality of preset alert conditions with associated event parameters and allow a user to enable and disable alert types and/or change associated event parameters. In some embodiments, alert manager 182 may be configured to overlay graphical elements representing detected events or event indicators on video streams displayed through video manager 180. For example, a detected motion, objects, or faces may be boxed or highlighted, tagged with relevant identifiers, or otherwise indicated in the video playback on user device 170. In some embodiments, alert manager 182 may be configured to interface with video analysis subsystem 156, video capture subsystem 152, and/or directly with cameras 110 for receiving event notifications or parameters. In some embodiments, alert manager 182 may include an interface to allow users to define one or more post-processing rules for use by the video cameras associated with the system. For example, users may be provided with rule templates and/or system generated rules (e.g., rules generated by calibration system 164) and allowed to accept, reject, and/or modify post-processing rules for filtering potential false object detections that should not trigger event notifications. These user-defined or accepted rules may then be included in the post-processing rule set for one or more cameras to prevent event notification for rule violations.

In some embodiments, camera manager 184 may include interface protocols and a set of functions and parameters for identifying, configuring, and managing cameras 110. Configuration manager 186 may include interface protocols and a set of functions and parameters for setting and managing system settings, user access controls, storage options, and other configuration settings. Network video recorder (NVR) manager 188 may include interface protocols and a set of functions and parameters for identifying, configuring, and managing network video recorder 130. For example, each of camera manager 184, configuration manager 186, and/or NVR manager 188 may include a series of graphical user interfaces for displaying their respective component identifiers and related configuration parameters and enabling the user to view and/or change those parameters for managing surveillance system 100 and its component systems. In some embodiments, camera manager 184, configuration manager 186, and/or NVR manager 188 may provide changes parameters to the effected components, such as camera manager 184 sending camera configuration parameter changes to selected cameras 110, NVR manager 188 sending NVR configuration parameter changes to network video recorder 130, and/or configuration manager 186 sending system configuration parameter changes to all effected components.

In some embodiments, analytics manager 190 may include interface protocols and a set of functions and parameters for selecting, training, and managing event detection algorithms. For example, analytics manager 190 may include a library of event detection algorithms for different event types. In some embodiments, the event detection algorithms may include a set of parameters and/or model weights that are preconfigured based on training data sets processed independent of surveillance system 100. For example, analytics manager 190 may include object detection algorithms for common objects, situations, and camera configurations. In some embodiments, analytics manager 190 may include preconfigured training data sets and/or allow the user to define training data sets for determining or refining event detection algorithm parameters and/or model weights based on predefined base algorithms or models. In some embodiments, analytics manager 190 may interface with analysis subsystem 156 for using the event detection algorithms configured through analytics manager 190 to process video data received by network video recorder 130 and/or selecting, training, and managing those algorithms.

Figure 2:
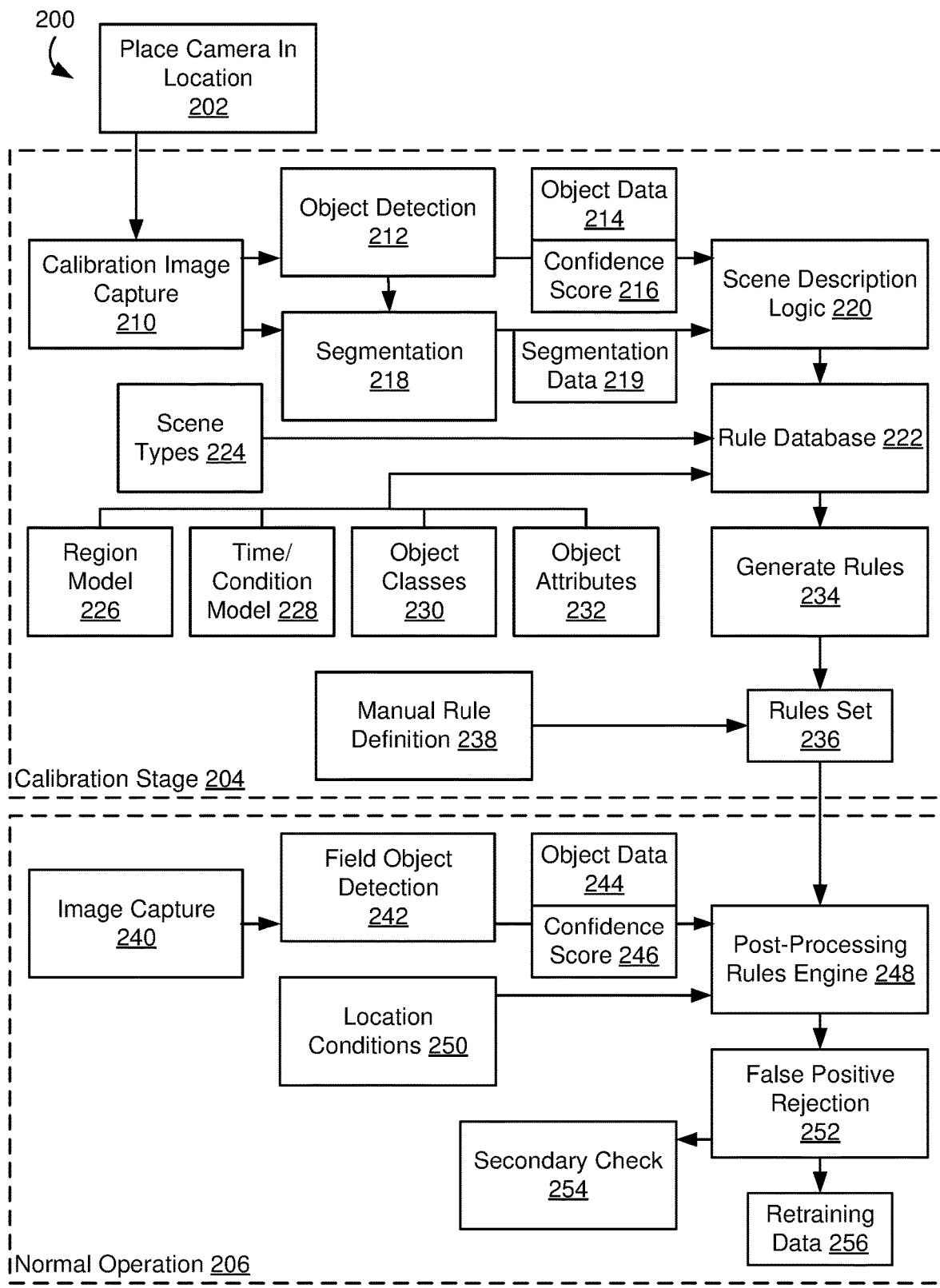
FIG. 2 schematically illustrates a calibration stage and normal operation for object detection that may be used by the computer-based surveillance system of FIG. 1.

FIG. 2 shows a schematic representation of calibration and object detection during normal operation that may be implemented in a computer-based surveillance system 200, such as surveillance system 100 in FIG. 1. At block 202, a video camera is placed in a location. For example, during the installation of surveillance system 200, each video camera may be physically mounted with a field of view that the user intends to monitor. In some embodiments, each video camera may be installed with a fixed position and field of view. In some embodiments, one or more cameras may include PTZ capabilities that allow them to change field of view from their mounted location.

In some embodiments, a calibration stage 204 may be initiated during or after camera installation. For example, a calibration system may be connected to surveillance system 200 and/or instantiated in one of the components thereof. In some embodiments, the timing and length of calibration stage 204 may be determined by a period of activity at the camera location and corresponding video data capture deemed sufficient for sampling video data representative of the background and types of activities that take place at the location. In some embodiments, a frame or a short video sequence representing the field of view of the camera may be sufficient for establishing the background information for the calibration process and generating appropriate post-processing rules for the camera location.

In some embodiments, calibration stage 204 may be followed by normal operation 206, during which the set of post-processing rules determined during calibration stage 204 are applied to the real-time processing of video data captured by the video camera. For example, normal operation 206 may reflect the operating life of the video camera and/or periods of video capture during which no calibration is occurring. In some embodiments, calibration stage 204 may be completed only once for each video camera, such as during or immediately following installation. In some embodiments, calibration stage 204 may occur periodically over the operating life of surveillance system 200 and/or be re-executed in response to events, changes, or updates that may change the conditions and/or post-processing rules that should be used. In some embodiments, surveillance system 200 and/or users thereof may modify the post-processing rules, such as adding new rules, deleting rules that do not seem to improve accuracy, and/or changing rule values, at any time during the operating life of the system, without necessarily re-triggering calibration stage 204.

During calibration stage 204, calibration images may be captured at block 210. For example, the video camera may capture and encoded images from its video image sensor. At block 212, object detection may be executed by the video camera (or a corresponding network video recorder, VSaaS server, or the calibration system itself) to determine object detection output data, such as object data 214 and confidence score 216. The calibration images may be sent over a network to a standalone calibration system or a calibration function instantiated in another system component. In some embodiments, object detection may be performed by one component, such as the camera or network video recorder, and object data 214 and confidence score 216 may be sent to the calibration system to support rule generation. In some embodiments, video data and object data from the field object detector may only be selectively provided to the calibration system to reduce data transfer and calibration processing demands. For example, when using cloud-based resources, the video camera may not be configured to stream video data and field object detector data continuously, but to instead have it selectively triggered by confidence scores and/or periodic sampling, such as periodic snapshots of the video data and corresponding field object detector data.

Object detection may be executed at block 212 for a selected video frame by the field object detector and/or the calibration system. Object detection may include computational image processing that detects objects of desired types or classes within an image and provides position information, such as bounding boxes, and detected object classes for those objects. Object detection algorithms may include one-stage and two-stage methods, where one-stage methods, such as you-only-look-once (YOLO) models, single shot detector multibox (SSD Multibox), RetinaNet, etc. use a single pass through a deep neural network and two-stage methods, such as various region-based convolutional neural networks (R-CNN) models (Faster R-CNN, Mask R-CNN, Cascade R-CNN, etc.), use a selective search for regions of interest followed by processing each region (bounding box for the region of interest) through a neural network. Object detection may generate position information for one or more detected objects in the video frame. For example, for each object detected, the object detector may output location data, such as at least two corner coordinates, for bounding boxes that provide both a frame for the detected object image data and locate it within the larger video frame. Resulting object data 214 may include object classes and object attributes for each detected object. Object attributes may include position information and other information generated as part of the object detection, such as feature vectors, orientation information, size, etc. Confidence score 216 may be generated by object detector for each object and provides a quantification of the likelihood the object detector has correctly detected the object. A detection threshold may be applied to confidence score 216 to determine whether a potentially detected object is treated as a detected object for use in the calibration process.

At block 218, image segmentation may be executed by the calibration system to determine the field of view of the video camera at the camera location and then divide the field of view into regions. For example, segmentation may detect and analyze background objects or features in the video frames to identify areas of the frame corresponding to walls, floors, ceilings, sky, windows, and other static features that may indicate the type of scene being viewed and/or the type of activities and objects likely to appear or move through those segments of the frame. Segmentation may divide the frame into regions corresponding to one or more background features. In some segmentation algorithms, edges and/or objects may be detected and used to locate region boundaries and, in other segmentation algorithms, the frame may be divided into regions (such as by applying a grid to the frame) and each region may be classified based on background objects or other markers. Image segmentation at block 218 may use one or more semantic segmentation algorithms configured for scene parsing that maps objects at a pixel level, such as the PyTorch image segmentation implementation. Pixel-level mappings may be used to determine image regions or may be mapped to a simplified set of background regions using grid or bounding box methods. In some embodiments, object data generated by the object detector at block 212 may be provided for use in block 218. Segmentation data 219 may include a set of region definitions (by pixel, bounding box, grid, etc.) and associated region identifiers, generally descriptive of the object or background class found (e.g., ceiling, floor, sky, road, etc.).

At block 220, object data 214 and segmentation data 219 may be processed through scene description logic 220. For example, scene description logic 220 may use object classes and region identifiers to assemble a set of scene description parameters representative of the background in the camera frame. In some embodiments, scene description logic 220 may use machine learning or artificial intelligence models to determine detected objects and regions corresponding to the background setting of a camera location. For example, sets of related objects/regions corresponding to particular location or scene types may be determined through a semantic clustering algorithms and object data 214 and segmentation data 219 may be mapped to such clusters and/or filtered for high relevance background markers in the video frame (or frames) being analyzed. In some embodiments, the relevant set of object data 214 and segmentation data 219 for a camera location may be determined as a set of scene description parameters to be used for determining relevant rules from rules database 222.

Rule database 222 may include a collection of logical rules that may be used to improve object detection through application of post-processing logic. For example, once an object has been detected by a field object detector in normal operation 206, post-processing rules may be applied to determine whether the detected object makes sense in the context of the camera location, position of the detected object in the frame, and other object attributes. Time and other conditions at the camera location may also be incorporated into the logical rules. In some embodiments, rules database 222 includes rule templates that may be automatically selected based on the scene description parameters for the camera location and processed through block 234 to generate customized rules for use in post-processing. Rule database 222 may be indexed using one or more scene description parameters to locate one or more rules or rule templates relevant to the camera location. For example, scenes containing sky regions or roads may use those region identifiers to select rules relevant to those regions and/or likely locations in which those regions appear. In some embodiments, rule database 222 may group rules or rule templates according to scene types 224 and scene description parameters may be mapped to scene types 224 for selecting relevant sets of rules. For example, indoor and outdoor scene types may have different sets of relevant rules or rule templates.

The rules and/or rule templates may include logical operators applied to comparisons between a rule value and a comparator field determined for the object detected. For example, rules may follow the general form of: if [comparator field]=[rule value] then logical violation detected (prevent event notification and/or initiate further processing). The comparator field is populated based on the detected object (and/or other conditions at the time of the object detection) and evaluated against the rule value set in the post-processing rule. Rules may include compound logic statements that combine various evaluations with and, or, xor, and similar logical operators. While the example rules herein are generally framed as detecting logical violations for excluding detected objects from event notifications, equivalent rules could be formed in the positive for determining which detected objects are allowed to invoke event notifications.

In some embodiments, rules database 222 may include rules or rule templates for evaluating a variety of logical conditions based on possible comparator fields. For example, one or more rules or rule templates may be based on a region model 226 that defines areas of the frame where one or more objects should not be detected. One or more rules or rule templates may be based on time or condition model 228 that defines time periods or other camera location conditions (e.g., night/dark, rain/fog, etc.) that lead to unreliable or impossible object detection. One or more rules or rule templates may be based on object classes 230 that define certain types of objects that cannot be detected in the camera location, generally based on a combination with other location, time/condition, or object attribute considerations. One or more rules or rule templates may be based on object attributes 232 that violate reason within the context of the camera location, such as object sizes, locations, or other features that are incompatible with the scene type, region model 226, or time/condition model 228. Region model 226 may define region identifiers that may be used as comparator fields. Time/condition model 228 may define time and condition values that may be used as comparator fields. Object classes 230 and object attributes 232 may be used as comparator fields.

At block 234, rules are generated for the camera location based on the calibration video data and corresponding scene description parameters. For example, the rules or rule templates selected from rule database 222 using the scene description parameters may be organized in a rule set 236 for use in post-processing detected objects. In some embodiments, rules templates are searched and selected, comparator fields are mapped to the types of region, time, condition, and object data available for the camera and object detector configuration, and rule values are set based on default values within rules database 222, such as previously configured values from similar scene types, manually configured values, and/or experimentally determined values. Each rule generated for rule set 236 may be customized to the camera configuration and location to avoid unnecessary processing overhead from irrelevant rules. A user or installer may also be provided with an interface for reviewing, accepting, and/or modifying the rules generated at block 234. In some embodiments, a user or installer may be provided with an interface to manually define rules for the camera at block 238. Rule set 236 may then be sent to and/or stored as a post-processing rule set in the camera, network video recorder, or other component responsible for determining event notifications, frequently the same component that instantiates the field object detector.

During normal operation 206, surveillance images may be captured at block 240. For example, the video camera may capture and encode images from its video image sensor. At block 242, field object detection may be executed by the video camera (or a corresponding network video recorder) to determine object detection output data, such as object data 244 and confidence score 246. Output data from field object detection 242 may be passed to post-processing rules engine 248. Post-processing rules engine 248 may receive object data 244 and use it to select rules from rule set 236 for evaluation and populate those rules with comparator values in the comparator fields. For example, rules set 236 may include one or more rules applicable to the "person" object class and post-processing rules engine 248 may populate the comparator fields with object class, position values, and size values for evaluating those rules. In some embodiments, post-processing rules engine 248 may receive additional values for evaluating rules based on location conditions 250. For example, a time value (such as a time stamp for when the video was captured) and other condition values (such as whether the low-light filter is active or other sensor output gathered by the camera) may also be used as comparator values for one or more rules. Each rule evaluated may correspond to a set of false positive conditions that indicate that the detected object should be rejected. If the evaluation of one or more rules by post-processing rules engine 248 indicates a likely false positive, false positive rejection may be initiated at block 252. For example, false positive rejection 252 may include preventing the object detection event that would normally result from the object detections (for example, based solely on its confidence score 246 meeting an object detection threshold). Rather than triggering an object detection event notification, false positive rejection 252 would prevent the generation of such an event or suppress the notification from being sent to other system components. In some embodiments, false positive rejection 252 may trigger further processing actions. For example, the detected object may be identified and/or sent for a secondary check 254, such as an object verification process using different object detection resources (such as a heavy weight object detection model or a combined image classifier/object detector process) or manual verification. Similarly, false positives may be aggregated for use in generating and/or filtering retraining data 256 to improve the likelihood that similar future cases may be not be detected by the retrained object detector (rather than relying on post-processing for rejection).

Figure 3:
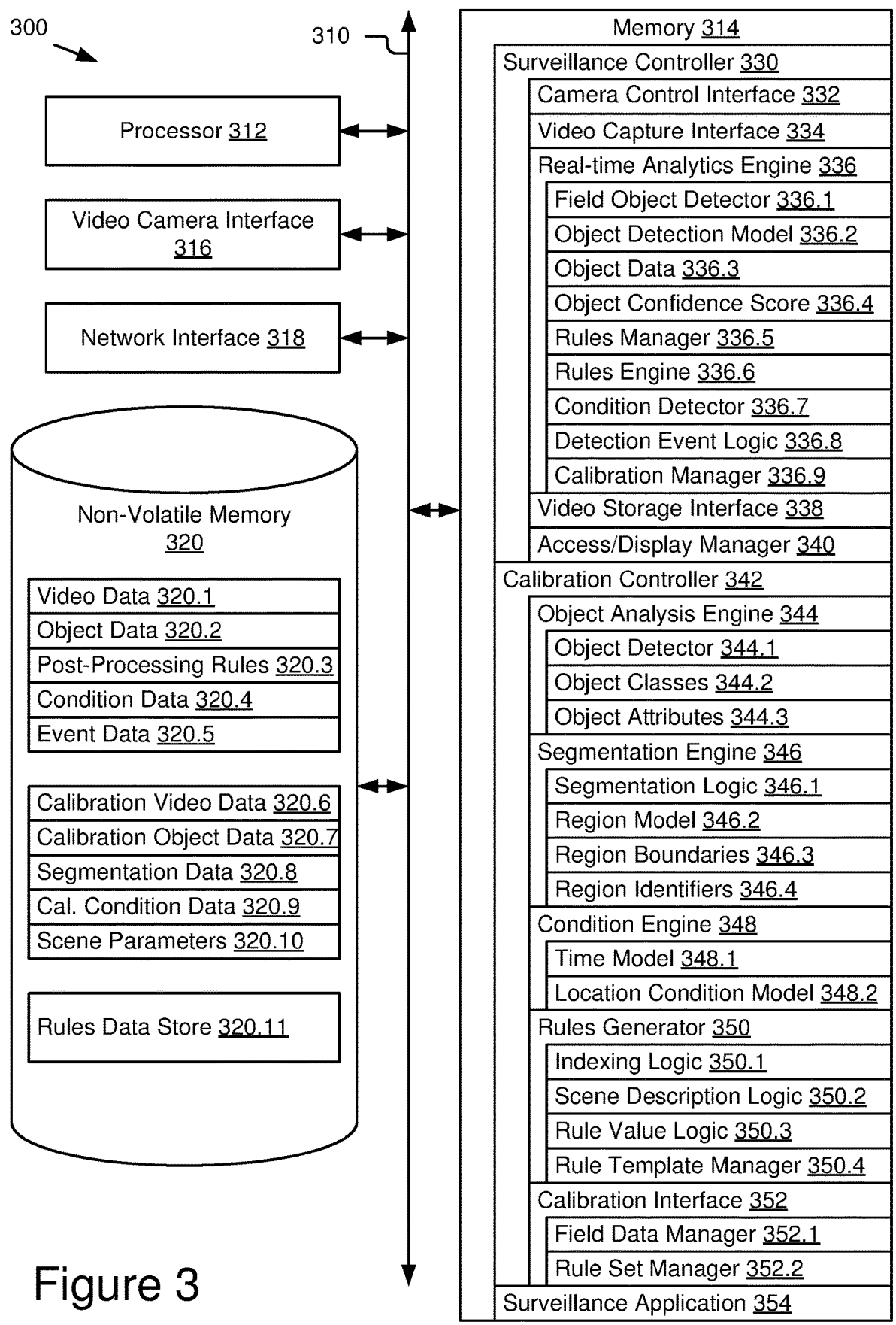
FIG. 3 schematically illustrates some elements of the computer-based surveillance system of FIG. 1.

FIG. 3 schematically shows selected modules of a surveillance system 300 configured for calibration and use of post-processing rules to improve object detection accuracy for the field object detector. Surveillance system 300 may incorporate elements and configurations similar to those shown in FIGS. 1-2. For example, surveillance system 300 may be configured in a network video recorder similar to network video recorder 130. In some embodiments, one or more of the selected modules may access or be instantiated in the processors, memories, and other resources of video cameras configured for video capture, similar to video cameras 110, and/or user devices configured for video monitoring, similar to user device 170. For example, a video camera and its embedded or attached compute resources may be configured with some or all functions of video surveillance controller 330 to provide real-time video stream analysis in a distributed fashion at the edge of surveillance system 300 before selectively providing the video stream and generated metadata to other system components, such as a network video recorder or user device, for additional analytics and/or use in a surveillance application 354. In some embodiments, calibration controller 342 may be embodied in a network video recorder, VSaaS server, user device, and/or specialized calibration system.

Surveillance system 300 may include a bus 310 interconnecting at least one processor 312, at least one memory 314, and at least one interface, such as video camera interface 316 and network interface 318. Bus 310 may include one or more conductors that permit communication among the components of surveillance system 300. Processor 312 may include any type of processor or microprocessor that interprets and executes instructions or operations. Memory 314 may include a random access memory (RAM) or another type of dynamic storage device that stores information and instructions for execution by processor 312 and/or a read only memory (ROM) or another type of static storage device that stores static information and instructions for use by processor 312 and/or any suitable storage element such as a hard disk or a solid state storage element. In some embodiments, processor 312 and memory 314 may be compute resources available for execution of logic or software instructions stored in memory 314 and computation intensive tasks, such as real-time analytics engine 336, may be configured to monitor and share these resources.

Video camera interface 316 may be configured for connection with one or more video cameras. For example, video camera interface 316 may include a plurality of ethernet ports and supporting protocols compatible with PoE standards for connecting to a plurality of cameras. In some embodiments, video camera interface 316 may include a PoE network switch for providing power to connected cameras and routing data packets to and from connected cameras, such as control and video data. Video camera interface 316 may not be included in some systems, particularly where surveillance controller 330 is substantially embodied in "smart cameras" and network interface 318 provides substantially all communication with other system components.

Network interface 318 may include one or more wired or wireless network connections to network, similar to network 102. Network interface 318 may include a physical interface, such as an ethernet port, and related hardware and software protocols for communication over the network, such as a network interface card or wireless adapter.

Surveillance system 300 may include one or more non-volatile memory devices 320 configured to store video data. For example, non-volatile memory devices 320 may include a plurality of flash memory packages organized as an addressable memory array and/or one or more solid state drives or hard disk drives. In some embodiments, non-volatile memory devices 320 may include a plurality of storage devices within, attached to, or accessible by a network video recorder and/or a calibration system for storing and accessing video data.

Surveillance system 300 may include a plurality of modules or subsystems that are stored and/or instantiated in memory 314 for execution by processor 312 as instructions or operations. For example, memory 314 may include a surveillance controller 330 configured to control at least one video camera, capture and store video streams from that camera, provide real-time analytics, and enable user access, such as through surveillance application 354. Memory 314 may include a calibration controller configured to analyze video data to determine post-processing rule sets for use by surveillance controller 330 to improve the accuracy of real-time analytics engine 336. Memory 314 may include a surveillance application configured to provide a user interface for monitoring, reviewing, and managing surveillance video and/or surveillance system 300.

Surveillance controller 330 may include interface protocols, functions, parameters, and data structures for connecting to and controlling cameras, capturing and storing video data from those cameras, and interfacing with calibration controller 342 and surveillance application 354. For example, surveillance controller 330 may be an embedded firmware application and corresponding hardware in a network video recorder configured for network and/or direct communication with a set of associated video cameras. Surveillance controller 330 may be configured as a central collection point for video streams from the associated video cameras that enables analysis of captured video data by analytics engines and presentation of video streams and video event alerts to a user through surveillance application 354. In some embodiments, surveillance controller 330 may be an embedded firmware application and corresponding hardware in or directly associated with a video camera or video camera array. In some embodiments, the functions for surveillance controller 330 may be divided among one or more video cameras and a network video recorder, network video server, and/or user device.

In some embodiments, surveillance controller 330 may include a plurality of hardware and/or software modules configured to use processor 312 and memory 314 to handle or manage defined operations of surveillance controller 330. For example, surveillance controller 330 may include a camera control interface 332, a video capture interface 334, a real-time analytics engine 336, a video storage interface 338, and an access and display manager 340.

Camera control interface 332 may include camera interface protocols and a set of functions, parameters, and data structures for using, configuring, communicating with, and providing command messages to cameras through video camera interface 316 and/or network interface 318. For example, camera control interface 332 may include an API and command set for interacting with control circuit in each camera to access one or more camera functions. In some embodiments, camera control interface 332 may be configured to set video configuration parameters for camera image sensors, microphones, and/or video encoders, access pan-tilt-zoom features, set or modify camera-based motion detection, tripwire, object detection, and/or low light detection parameters, and/or otherwise manage operation of cameras. For example, camera control interface 332 may maintain a video camera configuration table, pages, or similar data structures that includes entries for each video camera being managed and their respective camera-specific configuration parameters, active control features (such as PTZ control), and other configuration and control information for managing the cameras. In some embodiments, each camera may be assigned a unique camera identifier that may be used by surveillance controller 330, calibration controller 342, and/or surveillance application 354 to associate video data with the camera from which it was received. In some embodiments, camera control interface 332 may include one or more control features within a video camera to allow surveillance controller 330 to access camera control systems, such as PTZ motor controls, lens focus, filters, and other camera subsystems.

Video capture interface 334 may include camera interface protocols and a set of functions, parameters, and data structures for receiving video streams from associated cameras and/or video image sensors. For example, video capture interface 334 may include video data channels and related data buffers for managing a plurality of camera video data streams. In some embodiments, each video camera may be allocated a dedicated video channel for continuously and/or selectively sending its video stream to video capture interface 334. For example, received video streams may be buffered by video capture interface 334 before being streamed to real-time analytics engine 336, video storage interface 338, and access/display manager 340. In some embodiments, video capture interface 334 may be configured to selectively stream video data to calibration controller 342 during a calibration stage. In some embodiments, video capture interface 334 may receive or generate camera video metadata describing the camera video format, time and location information, and event or condition tags based on on-board camera analytics and/or sensors.

In some embodiments, video capture interface 334 may include a video stream manager configured to identify and manage the plurality of video streams being received from the cameras or video image sensors within a camera. For example, the video stream manager may manage video buffer allocation and space, processing of video streams from a camera video format or raw video format to another video format, directing buffered video frames through real-time analytics engine 336, and flushing of buffered video to storage through video storage interface 338 and/or for display via access/display manager 340. In some embodiments, the video stream manager may selectively send video streams to calibration controller 342 for calibration analysis and/or provide a notification to calibration controller 342 of the availability and storage location of video data for analysis in non-volatile memory 320 (as determined by video storage interface 338). In some embodiments, the video stream manager may be configured to use an encoder/decoder to encode video data, such as raw video data, in a desired video format. For example, the encoder/decoder may receive raw video frames in accordance with a defined frame rate and resolution to generate a time-dependent video stream that may be further processed according to a selected video codec and corresponding compression scheme. In some embodiments, the encoder/decoder may be used to decode camera video streams in a first (camera) video format and re-encode them in one or more other formats. For example, the video stream manager may use the encoder/decoder to change the resolution, image size, frame rate, codec, compression factor, color/gray-scale, or other video format parameters.

Real-time analytics engine 336 may include one or more video analytics models and a set of functions, parameters, and data structures for processing video streams from associated cameras and/or video image sensors to enable real-time or near-real-time response to objects in the video stream. In some embodiments, real-time analytics engine 336 may include at least one object detector 336.1 (referred to as field object detector 336.1 to distinguish from other object detection models that may be used by calibration controller 342) configured to determine the presence in a video frame of an object type or class of interest. Real-time analytics engine 336 may be configured to receive and incorporate post-processing rules 320.3 into post-processing of object detector output data and corresponding event detection to improve object detection accuracy without increasing the complexity or processing requirements of field object detector 336.1. More specifically, real-time analytics engine 336 may be configured to reject false positives based on logical rules embodied in post-processing rules 320.3 and executed using object data 336.3 and other time and condition values related to a detected object.

In some embodiments, field object detector 336.1 may be configured for one or more object types, sometimes referred to as an object class, such as people, faces, cars, license plates, dogs, etc. Object detector 336.1 may include an object detection model 336.2, such as a neural network algorithm, trained with data sets targeting the object types of interest. In some embodiments, real-time analytics engine 336 may be configured for a plurality of object types and include object detectors trained to each object type and/or an object detector that handles multiple object classes and returns class identifiers and position information for each object detected in a frame. Object detector 336.1 may be configured to return data detection output data including object data 336.3 and an object confidence score 336.4. For example, object data 336.3 may include an object class identifier and other object attributes, such as position information (e.g., bounding box coordinates), feature vectors, object size, orientation, etc. In some embodiments, object confidence score 336.4 may include a confidence value between 0 and 1 (0-100%), where 0 is no confidence and would not return object data and 1 is absolute certainty, with decimal values between 0 and 1 representing statistical confidence based on the application of object detection model 336.2 to the captured video data. In some embodiments, object data 336.3 may be stored in an object data structure 320.2 in non-volatile memory 320, such as an object data table or metadata tags associated with video data 320.1.

In some embodiments, real-time analytics engine 336 may include a rules manager 336.5 configured to receive, store, and access a set of post-processing rules for use in evaluating object data 336.3 to improve reported detection results. For example, rules manager 336.5 may receive post-processing rules 320.3 from calibration controller 342 following a calibration period and store them in non-volatile memory 320. Each time an object is detected, one or more rules from post-processing rules 320.3 may be accessed by rules manager 336.5 for execution by post-processing rules engine 336.6. For example, rules manager 336.5 may use the object class of the detected object to select relevant rules from post-processing rules 320.3. In some embodiments, rules engine 336.6 may include functions for receiving or accessing object data 336.3 and condition data 320.4, receiving or accessing selected rules from rules manager 336.5, populating the comparator fields and any other variables in the rules based on object data 336.3 and condition data 320.4, evaluating the rules based on the populated fields, and returning results for each logic statement. Rules engine 336.6 may evaluate each rule selected by the rules manager for the detected object and return a false positive indicator if any rule is violated by the detected object.

In some embodiments, post-processing rules 320.3 may include rules that apply camera location conditions, including time, to one or more comparator fields. For example, real-time analytics engine 336 may include a condition detector 336.7 that determines and stores condition data 320.4 for use by rules engine 336.6. Different rule outcomes may be appropriate at night or during the day, during working hours or when a facility is closed, when it is raining or when it is sunny, etc. In some embodiments, condition types may be selected from time, light condition, weather condition, etc. Condition detector 336.7 may be configured to determine one or more condition values from the video data, metadata, or other data available to the system. For example, condition detector 336.7 may evaluate video timestamps and tags or metadata related to lighting, weather, or other adjustment conditions. In some embodiments, condition detector 336.7 may use other sources for condition values, such as other sensors or network data sources. Condition detector 336.7 may determine condition values responsive to comparator fields identified by rules engine 336.6 and/or may determine and store condition values in condition data 320.4 for access and use by rules engine 336.6.

In some embodiments, post-processing rules engine 336.6 may be configured to modify the outcome of detection event logic 336.8 to reduce false positives. In some embodiments, event logic 336.8 may include logical rules configured to trigger video camera control, video storage, analytics, and/or user notification responses to real-time analytics, particularly object detection. For example, event logic 336.8 may be embodied in a rules engine that receives and/or maintains state information for triggers and outputs of camera control interface 332, video capture interface 334, real-time analytics engine 336, video storage interface 338, and/or access/display manager 340 to determine system responses to generated video streams and related conditions and analysis. In some embodiments, event logic 336.8 may be configured to generate alerts and/or notifications in response to a set of predefined event conditions. For example, when an object of a particular object type is detected in the video stream, an object detection notification or alert may be generated and sent to a user through access/display manager 340 and/or surveillance application 354. In some embodiments, event logic 336.8 may determine notification events that are used as triggers for operations by other systems. For example, an object detected event may determine a change in how raw video data is processed by video capture interface (such as increasing resolution of the resulting encoded video data), how the video cameras are positioned by camera control interface 332 (such as using PTZ control to change the field of view), where the resulting video is stored by video storage interface 338, and/or how access privileges are assigned for use by access/display manager 340. In some embodiments, event logic 336.8 may generate an event notification and send it over a network to surveillance application 354 to automatically execute one or more user-defined display, alert, system control, deep analytics, and/or metadata operations. Rules engine 336.6 may be configured to interrupt event notifications to other systems when a rules violation indicates a false positive. For example, detection event logic 336.8 may otherwise indicate that an object detection event has occurred based on the output of field object detector 336.1, but a rule violation indicator from rules engine 336.6 may cause detection event logic 336.8 to change the response, such as not sending the event notification. A rule violation may prevent detection event logic 336.8 from sending detected object event notifications to other systems and may trigger other automated processes, such as object verification.

In some embodiments, calibration manager 336.9 may include or access a subsystem for interfacing with calibration controller 342. For example, calibration manger 336.9 may determine the calibration period, send video data and object data to calibration controller 342, and receive post-processing rules 320.3 from calibration controller 342. In some embodiments, calibration manager 336.9 may include logic for selectively sending video data and/or output data from field object detector 336.1 to calibration controller 342. For example, calibration manager 336.9 may include logic for monitoring timers, confidence scores, and/or other parameters for determining whether and when data is shared with calibration controller 342.

Video storage interface 338 may include storage interface protocols and a set of functions, parameters, and data structures for managing storage of video data in non-volatile memory 320, such as storage devices and/or network video storage, for later retrieval and use by access/display manager 340 and/or calibration controller 342. For example, video storage interface 338 may write camera video stream data from video data buffers and/or storage path video data from video capture interface 334 to non-volatile memory 320 as video data 320.1. In some embodiments, video storage interface 338 may include a storage manager configured to manage video storage space in non-volatile memory 320 in accordance with one or more data retention and/or data archiving schemes. For example, surveillance system 300 may support continuous and/or triggered recording of video data from associated cameras and the storage manager may include logic for enforcing a data retention and overwriting policy whereby the fixed storage space of non-volatile memory 320 is recycled for storing a recent period of captured video, video data meeting specific retention criteria, and/or deleting or archiving video data after one or more periods of time defined in the data retention policy. Video storage interface 338 may also include a metadata manager to receive and store video metadata as tags or metadata tracks in the video data or in an associated metadata table, file, or similar data structure associated with the corresponding video data objects. In some embodiments, the metadata manager may be configured to include object data 320.2, condition data 320.4, and/or event data 320.5. For example, object data 320.2 may include bounding box coordinates and object type tags for each object detected within a video stream and event data 320.5 may include timestamps and event types for event occurrences in the video stream.

Access/display manager 340 may include APIs and a set of functions, parameters, and data structures for displaying video from video capture interface 334 and/or video storage interface 338 to a user display application, such as surveillance application 354. For example, access/display manager 340 may include a monitoring or display configuration for displaying one or more video streams in real-time or near real-time on a graphical user display of a user device and/or receive video navigation commands from the user device to selectively display stored video data from non-volatile memory 320. In some embodiments, access/display manager 340 may maintain an index of real-time/near real-time video streams and/or stored or archived video streams that are available for access by surveillance application 354. In some embodiments, the video index may include a corresponding metadata index that includes video data parameters (e.g., time, location, camera identifier, format, low light/normal light, etc.), detected video event metadata (event time, location, type, parameters, etc.), and/or video management parameters (expiration, active/archive, access control, etc.) for use in displaying and managing video data. Access/ display manager 340 may be configured to support surveillance application 354 when instantiated in the same computing device as surveillance controller 330, directly attached to the computing device hosting surveillance controller 330, and/or via a network within a LAN, WAN, VPN, or the internet. In some embodiments, access/display manager 340 may provide selective access to user video streams allocated by video capture interface 334 to the user video path.

Calibration controller 342 may include interface protocols, functions, parameters, and data structures for analyzing video data and object data from one or more object detectors to determine post-processing rules for a specific camera location and/or field of view. For example, calibration controller 342 may be an embedded firmware application and corresponding hardware in a network video recorder, VSaaS server, or separate calibration system in communication with surveillance controller 330. In some embodiments, calibration controller 342 may run on a separate computing device from surveillance controller 330. In some embodiments, calibration controller 342 may be active during a calibration stage until at least an initial set of post-processing rules are provided to real-time analytics engine 336 and may then be disconnected, uninstalled, or otherwise removed from surveillance system 300. In some embodiments, calibration controller 342 may include a plurality of hardware and/or software modules configured to use processor 312 and memory 314 to handle or manage defined operations of calibration controller 342. For example, calibration controller 342 may include an object analysis engine 344, a segmentation engine 346, a condition engine 348, a rules generator 350, and a calibration interface 352.

Object analysis engine 344 may include a set of functions, parameters, and data structures for processing target video streams and/or object data received from surveillance controller 330 for predefined object types to determine all relevant objects in one or more video frames. For example, object analysis engine 344 may be configured to process calibration video data 320.6 and/or calibration object data 320.7 received from surveillance controller 330 though calibration interface 352. Object analysis engine 344 may include logic and object detection thresholds for determining a set of calibration objects in a video frame, with a particular focus on object types that assist in identifying the background, location, and/or use case of a specific camera location. In some embodiments, object analysis engine 344 may include an object detector 344.1 that may be configured similarly to field object detector 336.1 and/or may be configured with a different set of object types or classes. For example, field object detector 336.1 may be configured for object classes of interest for the surveillance application, such as people, faces, vehicles, inventory, and other changeable aspects of the scene. Calibration object detector 344.1 may include additional object classes 344.2 related primarily to background features of the camera location, such as walls, ceilings, floors, doors, windows, sky, streets, buildings, furniture/fixtures, etc. Object analysis engine 344 may still include foreground and/or changeable object classes, such as people, vehicles, etc., as these may also be helpful in identifying the context and use case of the camera location. For the objects found in a calibration video frame, a set of calibration objects with object classes 344.2 and corresponding object attributes may be returned by object analysis engine 344. For example, each object may be represented by an object class and bounding box, which uniquely identifies each object in the frame, and may include additional object attributes 344.3, such as feature vectors, size, color, etc., depending on the parameters returned by the specific object detection algorithm being used for that object class. In some embodiments, the set of object data from object analysis engine 344 may be stored in scene description parameters 320.9 for use by segmentation engine 346 and rules generator 350.

Segmentation engine 346 may include a set of functions, parameters, and data structures for processing target video streams and/or object data to determine various contextual regions in the frame. For example, segmentation engine 346 may be configured to allocate pixels to object classes in the video frame and attempt to identify distinct background regions of the frame. In some embodiments, segmentation engine 346 may receive calibration object data 320.7 from field object detector 336.1 and/or object analysis engine 344 and apply segmentation logic 346.1 to the object class and position data. For example, segmentation logic 346.1 may be based on edge detection of objects within bounding boxes, as well as edge features that are not assigned to any object, and use clustering and/or logical rules to determine distinct regions in the video frame. In some embodiments, segmentation engine 346 may include one or more region models to assist with mapping object data and/or other detected background features to particular regions. For example, region models 346.2 for inside and outside scenes may assist with identifying contexts relevant to that type of scene (such as floors, ceilings, and walls indoors or sky, horizon, and ground outdoors). Segmentation engine 346 may define region boundaries 346.3 between identified regions. For example, region boundaries may be defined based on an object, feature, or grouping of objects edge or, regions may be allocated on a more simplified bounding box or grid allocation method. Segmentation engine 346 may assign region identifiers 346.4 to each region in the frame and store region boundaries 346.3 and region identifiers 346.4 in segmentation data 320.8. For example, regions may include identifiers based on the object class (or classes) in the region and/or may include numerical designations (such as based on position) that provide unique identifiers for each region. In some embodiments, segmentation engine 346 classifies each region according to a region model 346.2 and region identifier 346.4 that includes the region class for use by rules generator 350. In some embodiments, the set of region boundaries 346.3 and region identifiers 346.4 from segmentation engine 346 may be stored in scene description parameters 320.9 for use by rules generator 350.

Condition engine 348 may include a set of functions, parameters, and data structures for determining time or other condition-based comparator fields for post-processing rules. For example, condition engine 348 may include one or more models, such as time models, day/night models, weather models, etc., that describe various conditions that may exist at the camera location. These conditions may then be used by rules generator 350 to determine one or more rules that use condition comparisons in one or more logic statements. For example, a time model 348.1 may define open, closed, and receiving hours for a business as certain windows of time corresponding to each condition, and one or more rules may include statements like, if time=open and object class=X then violation. As another example, a location condition model 348.2 may define light and dark conditions based on a sensor and/or camera logic that determines when to use light and dark modes for capturing video data and the light/dark conditions may be used in the rules. Available condition models may be based on the video camera, user configuration (such as business hours), and/or determined by rules generator 350 and may include a set of condition identifiers and/or corresponding condition values describing condition sets. In some embodiments, condition engine 348 may generate, identify, and/or determine a set of condition data 320.9 that may be included in scene description parameters 320.10 for use by rules generator 350.

Rules generator 350 may include a set of functions, parameters, and data structures for determining a set of post-processing rules for a particular camera, camera location, and/or field of view. For example, rules generator 350 may generate one or more logical rule statements, including comparator fields, rules values, and connecting logic operators, for determining whether a detected object is likely to be valid or invalid. These rules may be logical data structures that can be transferred to the appropriate real-time analytics engine 336 and are compatible with the syntax and parsing logic of rules engine 336.6. In some embodiments, rules generator 350 may use a rules data store 320.11 configured to store previously configured rules and/or rule templates that may be selectively assigned and configured for the specific camera location. For example, a security system manufacturer or installer may aggregate prior rules and/or abstract prior rules into rule templates and store them in a knowledgebase for access by calibration controller 342. In some embodiments, rules data store 320.11 may be configured as a database or similar data structure with one or more index values for selecting specific rules of interest for a particular configuration. For example, rules or rule templates may be indexed by object class and one or more other scene description parameter values. In some embodiments, rules generator 350 may include indexing logic 350.1 configured to prioritize parameters from scene description parameters 320.10 and use selected parameters to search the rules index values and determine the relevant rules. For example, indexing logic 350.1 may compare scene description parameters, such as object classes, object attributes, region identifiers, and condition identifiers, to index values in rules data store 320.11 to select rules for a particular camera location.

In some embodiments, rules generator 350 may include scene description logic 350.2, which may pre-process scene description parameters 320.10 to determine one or more scene types for the camera location and field of view. For example, scene description logic 350.2 may use machine learning cluster analysis to determine the sets of scene description parameters that map to specific scene types, such as indoor, outdoor, commercial, residential, parking lot, entryway, hallway, etc. In some embodiments, once a camera location is mapped to one or more scene types by scene description logic 350.2, these scene types may be used to access rules data store 320.11. For example, rules data store 320.11 may be indexed by scene type and/or include predetermined sets of rules corresponding to each scene type and scene type from scene description logic 350.2 may be passed to indexing logic 350.1 for selecting one or more rules for the camera.

In some embodiments, rules data store 320.11 may include complete rules with fully populated comparator fields, rule values, and logic operators and these rules, once selected as relevant based on scene description parameters 320.10, may be added to the set of post-processing rules. In some embodiments, rules data store 320.11 may include rules templates that may require further configuration before being deployed as post-processing rules. For example, the rules template may layout the logical configuration and perhaps identify one or more comparator fields, but may need one or more rules values to be populated. Rules generator 350 may select rules templates and use rule value logic 350.3 to populate any incomplete fields in the rule template. For example, rule value logic 350.3 may determine variable comparator fields and populate them based on one or more scene description parameters for the camera location, or determine variable rules values and set them to a default value and/or execute a calculation to determine an appropriate rules value. In some embodiments, rule value logic 350.3 may include a user interface for confirming and/or receiving one or more rule values for configuring the rules. In some embodiments, rules generator 350 may include a rule template manager 350.4 configured to generate, store, modify, and delete rules and/or rule templates in rules data store 320.11. For example, rule template manager 350.4 may provide a user interface that enables a user to navigate rules and rule templates in rules data store 320.11 and provides editor and data manager functions for adding, deleting, and modifying rules, such as changing index values, default values, logic operators, etc.

Calibration interface 352 may include an API and functions, parameters, and data structures for exchanging data between surveillance controller 330 and calibration controller 342. For example, calibration interface 352 may interact with calibration manager 336.9 in surveillance controller 330 to send and receive data over internal or network protocols and/or through storage to non-volatile memory 320. In some embodiments, calibration interface 352 may include a field data manager 352.1 configured to receive video data and object data from field object detector 336.1 for generation of post-processing rules. For example, during the calibration stage, calibration manager 336.9 may continuously or selectively send video data and corresponding object data detected by field object detector 336.1 to field data manager 352.1 and field data manager 352.1 may access, buffer, and/or store the field data for use by object analysis engine 344, segmentation engine 346, condition engine 348, and rules generator 350. In some embodiments, calibration interface 352 may include a rule set manager 352.2 configured to aggregate rules generated by rules generator 350 and provide them to calibration manager 336.9 and/or rules manager 336.5 for use during normal operation. For example, upon completion of the calibration stage, rule set manger 352.2 may return the set of post-processing rules for that particular camera and camera location to calibration manager 336.9, which may then store a calibration set of post-processing rules 320.3 for use by rules manager 336.5 and rules engine 336.6.

Surveillance application 354 may include interface protocols, functions, parameters, and data structures for providing a user interface for monitoring and reviewing surveillance video and/or managing surveillance system 300, such as through surveillance controller 330. For example, surveillance application 354 may be a software application running on a user device integral to, connected to, or in network communication with surveillance controller 330 and/or a hosting network video recorder. In some embodiments, surveillance application 354 may run on a separate computing device from surveillance controller 330, such as a personal computer, mobile device, or other user device. In some embodiments, surveillance application 354 may be configured to interact with APIs presented by access/display manager 340.

In some embodiments, surveillance application 354 may include a plurality of hardware and/or software modules configured to use processor 312 and memory 314 to handle or manage defined operations of surveillance application 354. For example, surveillance application 354 may include a video manager, an alert manager, and an analytics manager.

The video manager may include APIs and a set of functions, parameters, and data structures for navigating and displaying video streams from video cameras accessed through surveillance controller 330. For example, the video manager may include a graphical user interface and interactive controls for displaying lists, tables, thumbnails, or similar interface elements for selecting and displaying video streams for particular cameras, times, locations, and/or events. In some embodiments, the video manager may enable split screen display of multiple camera video streams. For example, the near real-time video streams (with a predetermined lag based on network lag, storage, and processing times) from all active cameras may be displayed on a monitoring interface or a set of video streams corresponding to a detected event may be displayed in an event review interface. In some embodiments, the video manager may include a data structure summarizing all video data stored in surveillance system 300 to enable the user to locate and view older surveillance video. For example, a video management log or database may include entries for stored video data indexed by related metadata, such as video data parameters (e.g., time, location, camera identifier, format, low light/normal light, etc.), detected video event metadata (event time, location, type, parameters, etc.), and/or video management parameters (expiration, active/archive, access control, etc.).

The alert manager may include APIs and a set of functions, parameters, and data structures for setting, monitoring, and displaying alerts based on detected video events. For example, the user may define a set of trigger events that generate visual, audible, tactile, and/or notification-based (electronic mail, text message, automated call, etc.) alerts to a user device. In some embodiments, the alert manager may include a plurality of preset alert conditions with associated event parameters and allow a user to enable and disable alert types and/or change associated event parameters. In some embodiments, the alert manager may be configured to operate in conjunction with event overlay function to overlay graphical elements representing detected events or event indicators on video streams displayed through the video manager. For example, detected motion, objects, or faces may be boxed or highlighted, tagged with relevant identifiers, or otherwise indicated in the video playback on the user device.

The analytics manager may include APIs and a set of functions, parameters, and data structures for selecting, training, and managing event detection algorithms. For example, the analytics manager may include a user interface to analytical model library for one or more analytics engines. In some embodiments, the event detection algorithms may include a set of parameters and/or model weights that are preconfigured based on training data sets processed independent of surveillance system 300. For example, the analytics manager may include object detection algorithms for common objects, situations, and camera configurations. In some embodiments, the analytics manager may include access to training services and/or preconfigured training data sets. For example, the analytics manager may enable the user to define training data sets for determining or refining event detection algorithm parameters and/or model weights based on predefined base algorithms or models. In some embodiments, the analytics manager may also enable user control of the calibration stage and operations of calibration controller 342. In some embodiments, the analytics manager may interface directly with real-time analytics engine 336 for selecting, training, managing, and using the event detection algorithms configured through the analytics manager. In some embodiments, the analytics manager may interface with access/display manager 340 for accessing and managing real-time analytics engine 336 and/or one or more analytics engines supporting deep analytics through the network video recorder, VSaaS server, etc.

Figure 4:
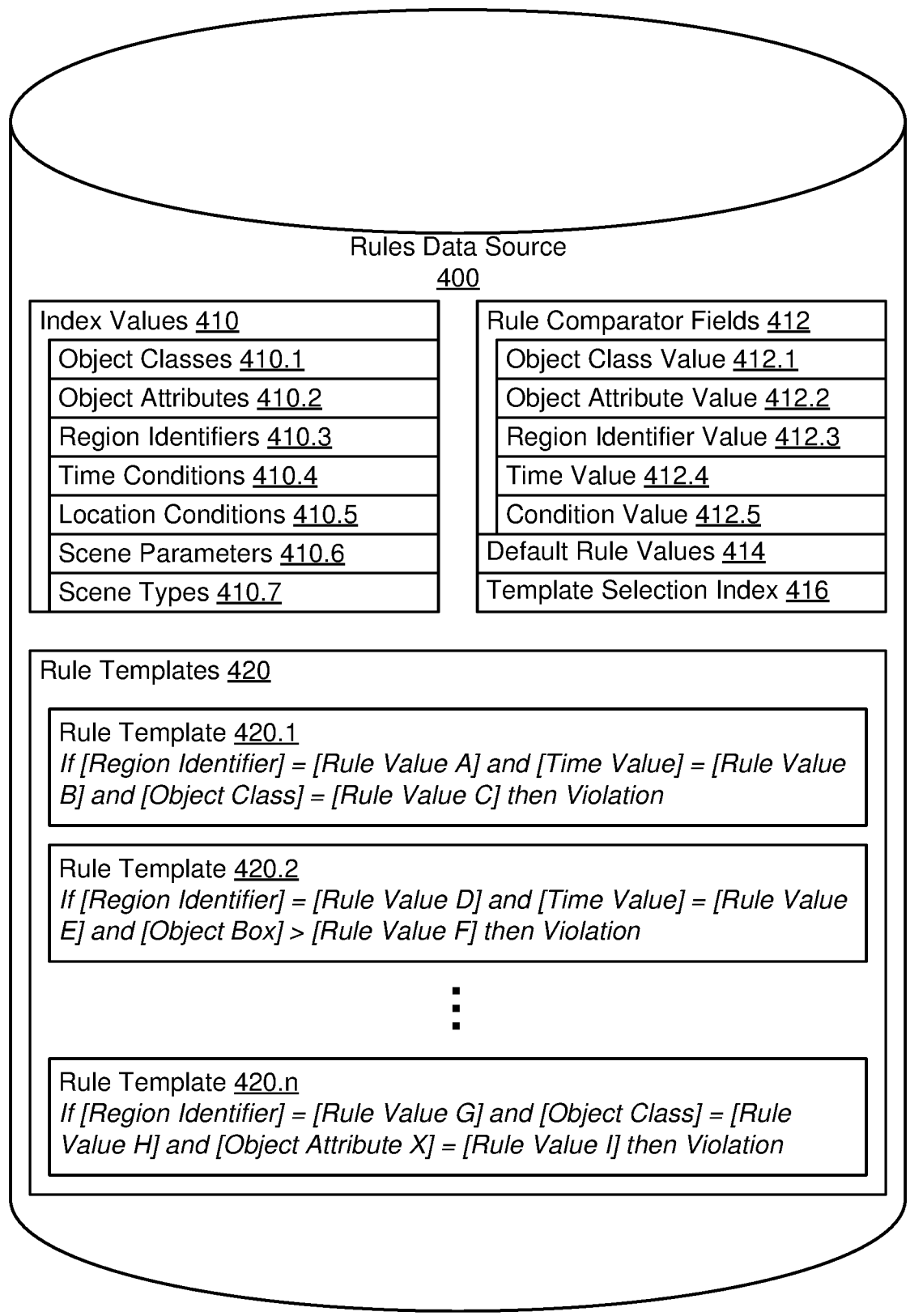
FIG. 4 schematically illustrates some elements of a rule database that may be used by the computer-based surveillance systems of FIGS. 1 and 3.

FIG. 4 shows an example rules data source 400 for use by surveillance system 300 in greater detail. Rules data source 400 may be configured with a set of index values 410 that may be used to locate specific rule templates within rules data source 400. Example index values 410 may include object classes 410.1, object attributes 410.2, region identifiers 410.3, time conditions 410.4, location conditions 410.5, other scene description parameters 410.6, and scene types 410.7. Rules data source 400 may be configured with a set of rule comparator fields that are used by the rules engine to populate runtime values for a detected data object into the rule for evaluation. Example rule comparator fields 412 may include object class value 412.1, object attribute value 412.2, region identifier value 412.3, time value 412.4, and location condition value 412.5. Rules data source 400 may include default rule values 414 that may be used to determine rule values for the logical comparisons in rule templates 420. For example, default rule values 414 may include threshold values for specific comparisons based on calculated, experimental, population-based, and/or user-defined values. In some embodiments, index values 410 may be organized in a template selection index 416 that may enable search and/or hierarchical grouping of related rule templates. For example, template selection index 416 may include tables indexed by scene types 410.7, object classes 410.1 within those scene types, and object attributes 410.2 within those object classes and mapping those values to relevant rule templates 420. In some embodiments, each rule template 420 includes at least one template selection index value for selecting the rule template, such as an index value within the rule template data structure itself or associated with the rule template through an index, such as template selection index 416, and pointer or identifier to the rule template.

Rules data source 400 may include a plurality of rules templates 420.1-420.n. Each rule template 420 may be associated with and/or indexed by one or more index values 410 and may include one or more logical rule statements containing rule comparator fields 412, default rule values 414, and corresponding logic operators. For example, rule template 420.1 includes "If [Region Identifier]=[Rule Value A] and [Time Value]=[Rule Value B] and [Object Class]= [Rule Value C] then Violation". At runtime, the region identifier, time value, and object class may be populated based on the object class, object attributes, and time condition for the detected object and, based on the outcomes of the comparisons and their connecting logic operators, determine whether the detected object violates the rule and should be treated as a false positive. Similarly, rule template 420.2 includes "If [Region Identifier]=[Rule Value D] and [Time Value]=[Rule Value E] and [Object Box]>[Rule Value F] then Violation", where object box is a size value derived from the objects bounding box and rule value F is a maximum allowable size for credible objects in the field of view. Rule template 420.n includes "If [Region Identifier]= [Rule Value G] and [Object Class]=[Rule Value H] and [Object Attribute]=[Rule Value I] then Violation" and so on for any number of rule templates. Note that each rule doesn't necessarily have to be a compound logic state, may use logical operations other than "and", and may include any number of logical statements, so long as they resolve to a single violation determination.

Figure 5:
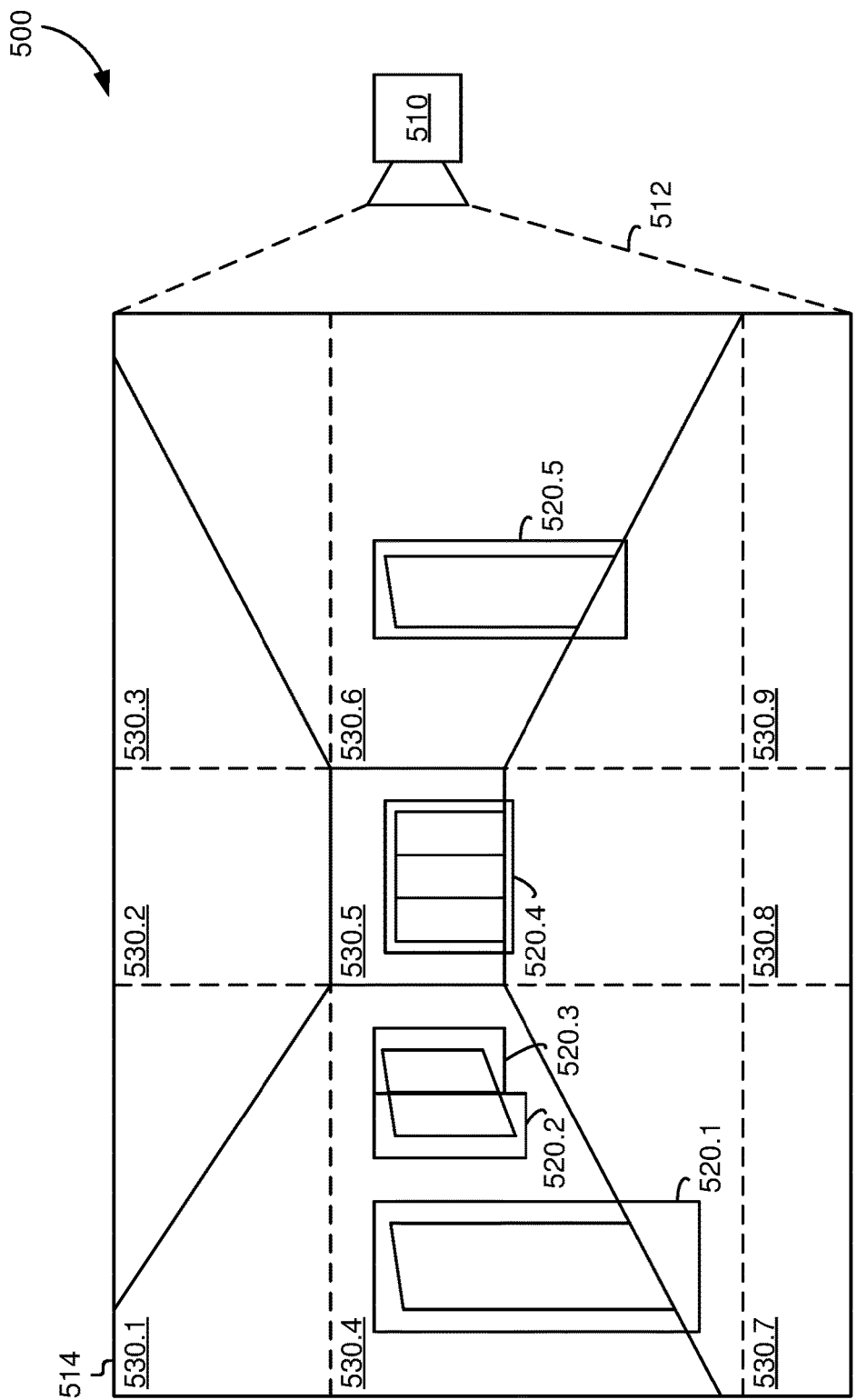
FIG. 5 schematically illustrates analysis of a video frame representing the field of view of a deployed camera for configuring a rule set.

FIG. 5 shows an example calibration video capture 500 by surveillance system 300. A video camera 510 has a field of view 512 and captures video frame 514 with its image sensor and sent to a calibration controller. Object detection and segmentation analysis may be performed by the calibration controller with the results shown in FIG. 5. Door class objects are detected in bounding box 520.1, bounding box 520.4, and bounding box 520.5. Two sign class objects are detected in bounding box 520.2 and bounding box 520.3. Edge detection and segmentation logic is able to determine floor, walls, and ceiling and segments the frame into nine regions 530.1-530.9 for use in locating foreground objects in a context within the video frame and background. The segmentation logic assigns region identifiers, such as floor and ceiling to particular regions. The object classes, region identifiers, and related object data are stored as a set of scene description parameters for this video frame and camera location. Based on the scene description parameters, the rules generator assigns scene types of indoor and hallway for the camera location. Using the scene types, the rules generator selects a set of rule templates and populates them for the camera location. The calibration controller returns the set of post-processing rules selected to video camera 510 for use in runtime analysis of objects of interest, such as people, as they are detected by the video camera's real-time analysis engine.

Figure 6:
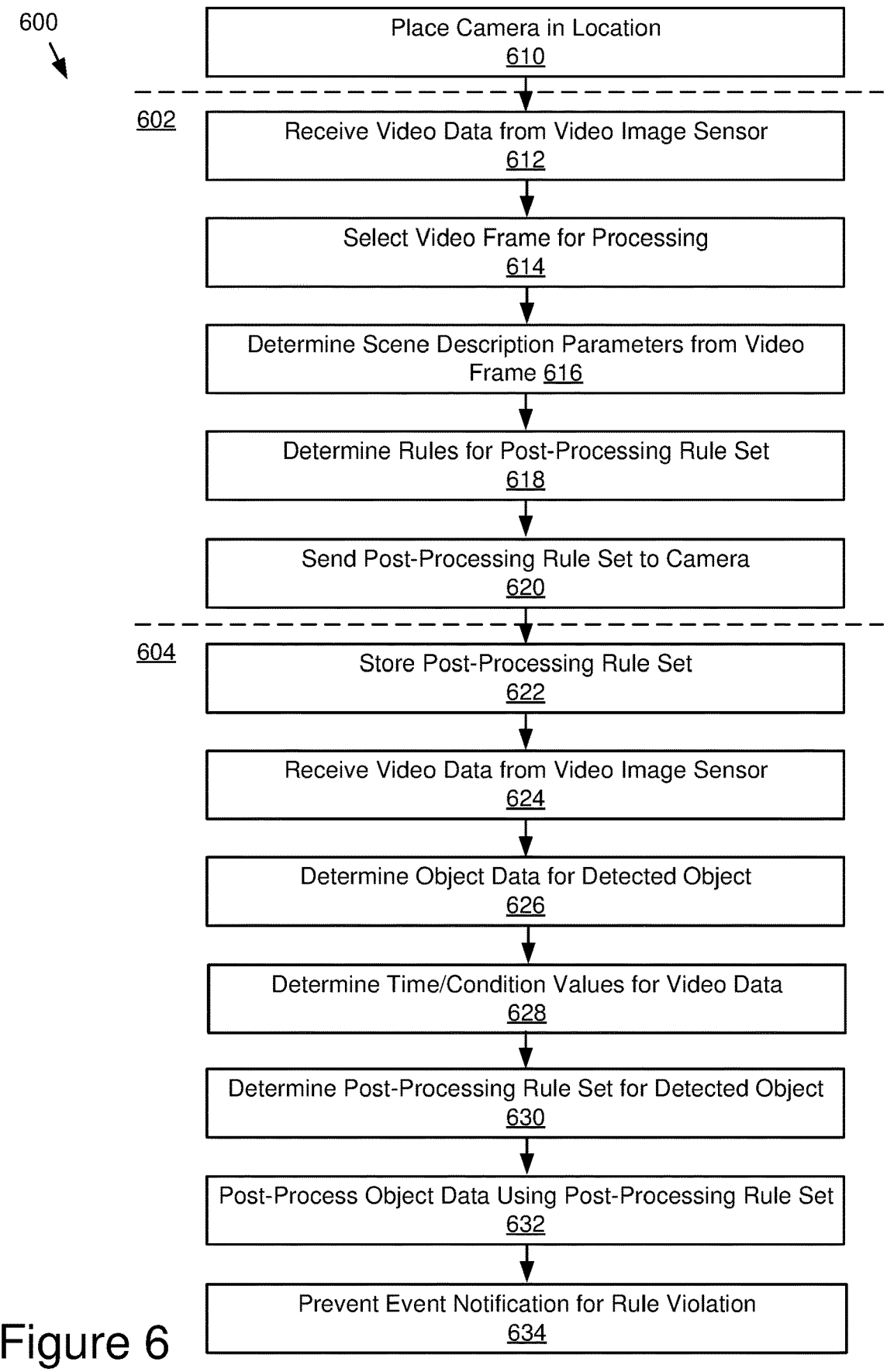
FIG. 6 is a flowchart of an example method of deploying, calibrating, and using a surveillance video camera with a post-processing rule set.

As shown in FIG. 6, surveillance system 300 may be operated according to an example method of deploying, calibrating, and using a surveillance video camera with a post-processing rule set, i.e., according to method 600 illustrated by blocks 610-634 in FIG. 6.

At block 610, a video camera may be placed in a location. For example, during installation, a video camera may be mounted in a physical location with a field of view for image capture. Once the camera is placed, method 600 may include a calibration process 602, followed by field operation 604.

At block 612, video data may be received from a video image sensor. For example, the video camera may capture one or more video segments for use in calibration.

At block 614, a video frame may be selected for processing. For example, a calibration controller may select a frame for analysis from the calibration video segment received from the camera.

At block 616, scene description parameters may be determined from the video frame. For example, the calibration controller may use an object detector, segmentation logic, and/or other video analysis tools to determine parameter values, such as object classes, object attributes, region identifiers, etc., descriptive of the content in the video frame.

At block 618, rules for a post-processing rule set may be determined. For example, the calibration controller may generate a plurality of logical rules configured to identify false positives.

At block 620, the post-processing rule set may be sent to the video camera. For example, the calibration controller may send the set of post-processing rules from block 618 to the video camera for use during normal operation. This may conclude calibration process 602.

At block 622, the post-processing rule set may be stored. For example, the video camera may store the post-processing rule set from the calibration controller in a local memory for evaluation responsive to object detection.

At block 624, video data may be received from the video image sensor. For example, the video camera may capture video data during surveillance mode to monitor activities in the camera location.

At block 626, object data may be determined for a detected object. For example, a field object detector of the video camera may detect and object having an object class and related object attributes that meets the object detection threshold for the camera configuration.

At block 628, time and/or condition values may be determined for the video data from which the object was detected. For example, the video camera may also generate a timestamp for the video frames and/or other metadata reflecting camera conditions.

At block 630, a post-processing rule set may be determined for the detected object. For example, the post-processing rule set stored by the camera at block 622 may include a subset of rules applicable to the detected object class and/or the time or region in which the object was detected.

At block 632, the object data (and corresponding condition data) may be post-processed using the post-processing rule set. For example, the subset of relevant rules may be evaluated based on the object data from block 626 and the time/condition values from block 628 to determine whether the detected object violates the rule or not.

At block 634, event notifications may be prevented for rule violations. For example, the video camera may reject detected objects that violate one or more rules as a false positive and not generate the event notification(s) that would normally be triggered by a detection of the object class.

Figure 7:
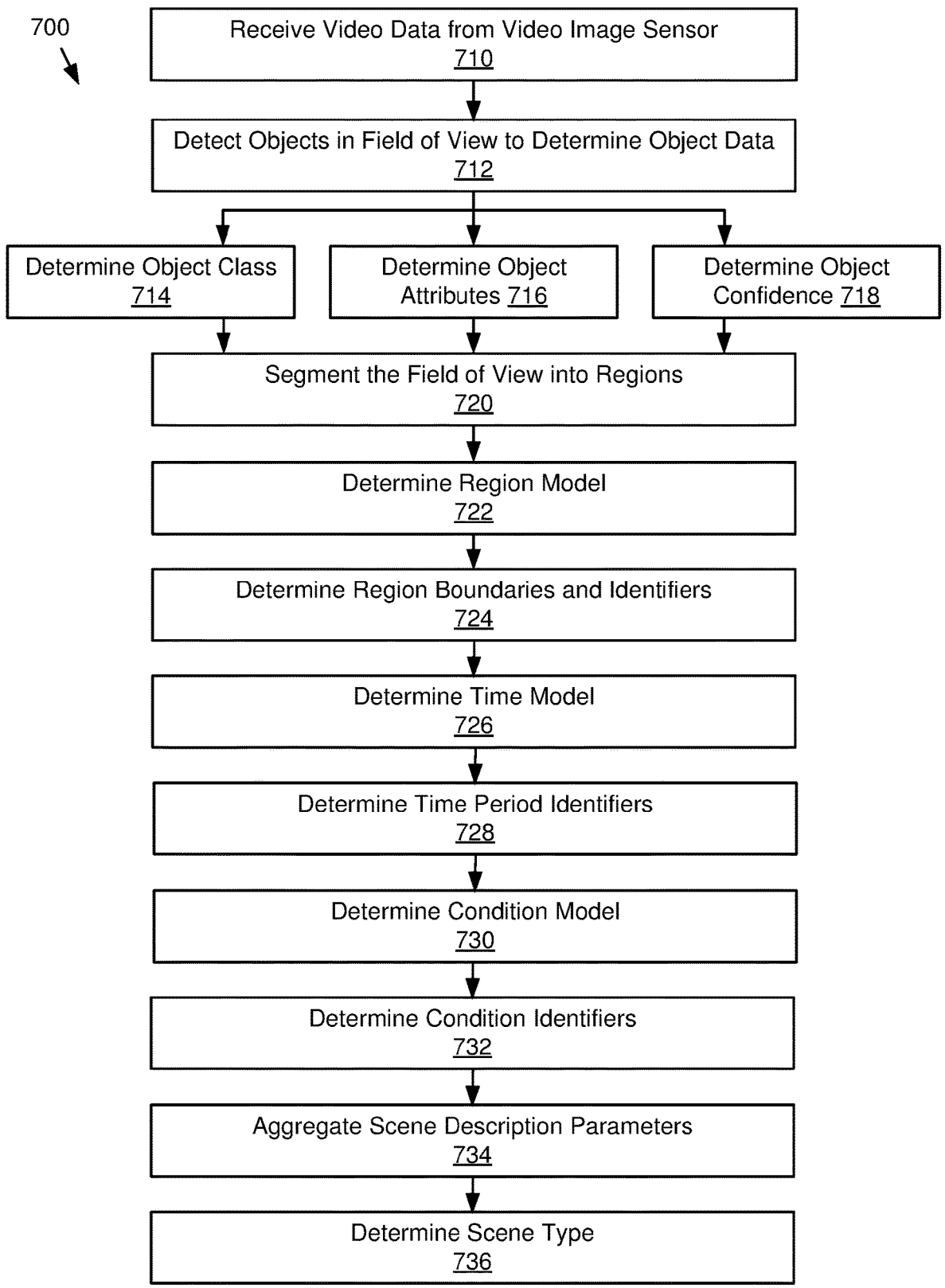
FIG. 7 is a flowchart of an example method of determining scene description parameters for calibrating a post-processing rule set for a surveillance video camera.

As shown in FIG. 7, surveillance system 300 may be operated according to an example method for determining scene description parameters for calibrating a post-processing rule set, i.e., according to method 700 illustrated by blocks 710-736 in FIG. 7.

At block 710, video data may be received from a video image sensor. For example, a surveillance controller may capture and encode video data and send it to a calibration controller for processing.

At block 712, objects may be detected in the field of view to determine object data. For example, one or more object detectors may be used to process the video frames and detect a number of object classes relevant to classifying the scene and/or use case of the video camera and location. At block 714, object classes may be determined for the detected objects. At block 716, object attributes may be determined for the detected objects. At block 718, object confidence values may be determined for the detected objects. This object data may be selectively included in the scene description parameters.

At block 720, the field of view may be segmented into regions. For example, segmentation logic may be applied to the video frame and/or object data from blocks 714-718 to determine different regions of the video frame based on the video content.

At block 722, a region model may be determined. For example, the segmentation logic may generate a set of objects and/or features that correspond to indoor versus outdoor scenes and a region model may be selected that assists in segmenting the frame, such as a model that includes walls, floors, and ceilings for an indoor model.

At block 724, region boundaries and identifiers may be determined. For example, based on the region model and object data, the segmentation logic may determine the boundaries between regions mapped to edges and/or a grid or box system and apply descriptive region identifiers that uniquely identify each region of the frame.

At block 726, a time model may be determined. For example, the calibration controller may include and/or select a time model configured for the use of the camera in the camera location, such as a time model based on business hours.

At block 728, time period identifiers may be determined. For example, the time model may include time period identifiers (e.g., open and closed) and corresponding time windows for those time periods.

At block 730, a condition model may be determined. For example, the calibration controller may include and/or select a condition model configured for the camera parameters or video metadata generated by the camera or related sensors, such as light and dark conditions.

At block 732, condition identifiers may be determined. For example, the condition model may include condition identifiers (e.g., light and dark) and corresponding condition parameters, such as video metadata values.

At block 734, scene description parameters may be aggregated. For example, the calibration controller may aggregate, organize, and/or filter the object data, region identifiers, and condition identifiers to provide a set of scene description parameters specific to the camera location and calibration video data.

At block 736, a scene type may be determined. For example, the calibration controller may apply scene description logic to the set of scene description parameters aggregated at block 734 to determine one or more scene types to associate with the camera location and use for post-processing rule selection and configuration.

Figure 8:
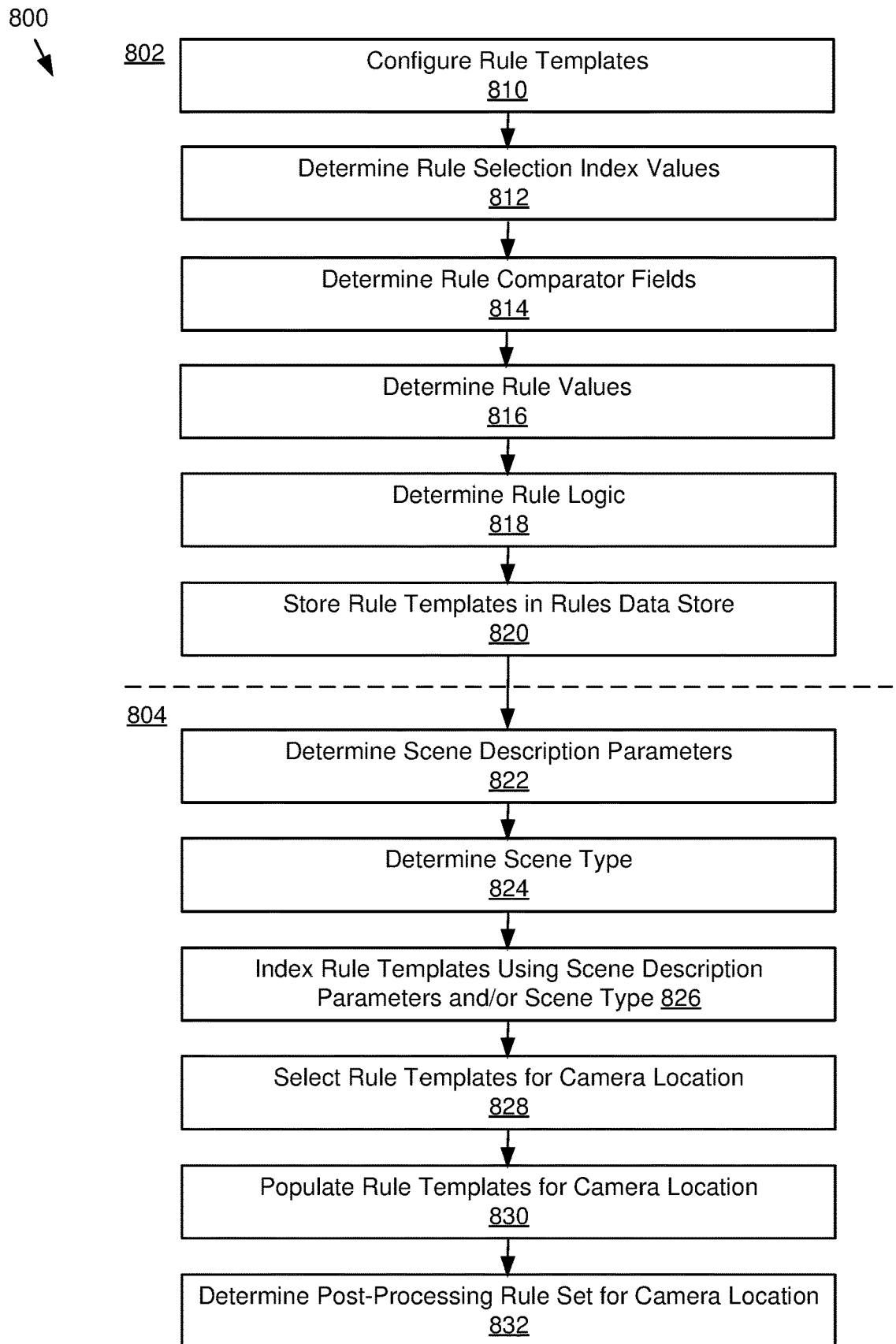
FIG. 8 is a flowchart of an example method of determining a post-processing rule set using rule templates and scene description parameters.

As shown in FIG. 8, surveillance system 300 may be operated according to an example method for determining a post-processing rule set using rule templates and scene description parameters, i.e., according to method 800 illustrated by blocks 810-832 in FIG. 8. A rules data store configuration process 802 may be used to configure a rules data store and a rule configuration process 804 may use rule templates from the rule data store to configure a relevant set of post processing rules.

At block 810, rule templates may be configured. For example, a surveillance system manufacturer or installer may develop a variety of rule templates for identifying detected objects that violate logical rules and can be excluded as false positives.

At block 812, rule selection index values may be determined. For example, the rule templates may be organized according to possible use cases and indexed according to object classes, time or region identifiers, scene types, or other searchable parameters.

At block 814, rule comparator fields may be determined. For example, each rule template may be based on one or more comparator fields that may be populated at runtime based on object data and/or condition data to evaluate the resulting rule.

At block 816, rule value fields may be determined. For example, each rule template may be based on one or more comparisons between comparator fields and corresponding rule values that determine whether the comparator field meets the rule conditions.

At block 818, rule logic may be determined. For example, each rule template may include one or more logic statements to be evaluated and these logic statements may be connected using logic operations, such as and, or, etc.

At block 820, the rule templates may be stored in a rules data store. For example, each rule template may be stored in a rules data store used for configuring a variety of surveillance systems for different camera locations and use cases.

At block 822, scene description parameters may be determined and, at block 824, a scene type may be determined.

For example, a calibration controller may determine the scene description parameters and scene type using method 700 as described above for FIG. 7.

At block 826, scene description parameters and/or scene type may be used to index the rules templates. For example, the calibration controller may use one or more scene description parameters and/or scene types to search or otherwise navigate the rules templates in the rules data store to determine rules relevant to the camera and location being configured.

At block 828, a rule template may be selected for the camera location. For example, the calibration controller may select at least one rule template that matches the index values searched in the rules data store.

At block 830, the rule templates may be populated based on the camera location. For example, the calibration controller may determine default rules values for each comparison in the rules template and any other rule configuration decisions or modifications may be made, sometimes based on user input.

At block 832, a post-processing rule set may be determined for the camera location. For example, the calibration controller may return a set of configured rules based on the scene description parameters and/or scene type determined from the calibration video.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a video image sensor configured to be positioned with a field of view of a location; and
a calibration controller configured to, during a calibration period:
receive calibration video data from the video image sensor;
determine, from the calibration video data and using a first set of object classes, at least one background object corresponding to a background setting of the field of view;
determine, based on the at least one background object, scene description parameters for the location;
determine, based on the scene description parameters and from a plurality of possible rules, a post-processing rule set for detected objects at the location, wherein:
the detected objects are a different object class than the at least one background object; and
at least a portion of the plurality of possible rules are indexed to different scene description parameters;
a surveillance controller configured to:
receive, during a surveillance period that is after the calibration period, surveillance video data from the video image sensor, wherein the surveillance video data is different than the calibration video data;
determine, using a field object detector, surveillance object data for a detected object in the surveillance video data;
post-process, using the post-processing rule set, the surveillance object data to determine whether the detected object violates at least one rule from the post-processing rule set, wherein at least one rule in the post-processing rule set is configured to compare a value from the surveillance object data to a rule value indicating that a violation has occurred;
send, responsive to no violation of the post-processing rule set occurring, an event notification for the detected object to a video surveillance application; and
prevent, responsive to the detected object violating the at least one rule, the event notification.

2. The system of claim 1, wherein:
determining the surveillance object data for the detected object comprises detecting, by the field object detector, the detected object from the surveillance video data with a confidence score that meets an object detection threshold for the event notification; and post-processing the surveillance object data is responsive to the detected object meeting the object detection threshold.

3. The system of claim 2, further comprising:

a video camera housing, wherein:
the video camera housing encloses:
the video image sensor;
the surveillance controller; and
a network interface configured to communicate with a network; and
the surveillance controller is further configured to:
send, to the calibration controller and over the network:
first calibration object data from the field object detector; and
calibration video data from the video image sensor; and
receive, from the calibration controller and over the network, the plurality of rules for the post-processing rule set.

4. The system of claim 2, wherein:
the first set of object classes comprises a plurality of object types corresponding to different background settings;
determining the at least one background object comprises detecting the at least one background object and determining corresponding calibration object data;
the first set of object classes and calibration object data are mapped to the scene description parameters; and
the field object detector is configured for detecting objects that do not include the first set of object classes.

5. The system of claim 4, wherein:
the calibration object data includes at least one of:
an object class; and
an object attribute; and
the calibration controller is further configured to, during the calibration period, evaluate, using the calibration object data, a rules data store comprising the plurality of possible rules to determine the at least one rule in the post-processing rule set.

6. The system of claim 2, wherein:
the calibration controller is further configured to, during the calibration period:
segment the field of view into a plurality of regions corresponding to the background setting; and
determine, based on the calibration video data, a region identifier for each region of the plurality of regions;
the scene description parameters include at least one region identifier mapped to the at least one background object; and
the at least one rule in the post-processing rule set is based on the detected object appearing in the region corresponding to the at least one region identifier.

7. The system of claim 2, wherein:
the calibration controller is further configured to, during the calibration period, determine a plurality of time periods for the location; and
the at least one rule in the post-processing rule set is based on at least one time period of the plurality of time periods.

8. The system of claim 2, further comprising:
a rules data store comprising a plurality of rule templates corresponding to the plurality of possible rules, wherein:
each rule template includes:
at least one selection index value; and
at least one rule comparator field;
the calibration controller is further configured to, during the calibration period, use at least one scene description parameter to index, in the rules data store, a selected rule template of the plurality of rule templates to determine the at least one rule in the post-processing rule set; and
the at least one scene description parameter indicates the at least one selection index value of the selected rule template.

9. The system of claim 8, wherein the at least one rule comparator field for each rule template of the plurality of rule templates includes at least one of:
a region identifier value;
a time value;
an object class value;
an object attribute value; and
a location condition value.

10. The system of claim 1, wherein the surveillance controller is further configured to:
determine at least one location condition; and
use the at least one location condition to post-process the surveillance object data to determine whether the detected object violates the at least one rule from the post-processing rule set.

11. A computer-implemented method, comprising:
receiving, during a calibration period, calibration video data from a video image sensor positioned with a field of view of a location; and
determining, from the calibration video data and using a first set of object classes, at least one background object corresponding to a background setting of the field of view;
determining, based on the at least one background object, scene description parameters for the location;
determining, based on the scene description parameters and from a plurality of possible rules, a post-processing rule set for detected objects at the location, wherein:
the detected objects are a different object class than the at least one background object; and
at least a portion of the plurality of possible rules are indexed to different scene description parameters;
receiving, during a surveillance period following the calibration period, surveillance video data from the video image sensor, wherein the surveillance video data is different than the calibration video data;
determining, using a field object detector, surveillance object data for a detected object in the surveillance video data;
post-processing, using the post-processing rule set, the surveillance object data to determine whether the detected object violates at least one rule from the post-processing rule set, wherein at least one rule in the post-processing rule set is configured to compare a value from the surveillance object data to a rule value indicating that a violation has occurred;
sending, responsive to no violation of the post-processing rule set occurring, an event notification for the detected object to a video surveillance application; and
preventing, responsive to the detected object violating the at least one rule, the event notification.

12. The computer-implemented method of claim 11, wherein:
determining the surveillance object data for the detected object comprises detecting, by the field object detector, the detected object from the surveillance video data with a confidence score that meets an object detection threshold for the event notification; and post-processing the surveillance object data is responsive to the detected object meeting the object detection threshold.

13. The computer-implemented method of claim 12, further comprising, during the calibration period:

determining, based on the calibration video data, calibration object data for the at least one background object in the calibration video data, wherein:

the scene description parameters include the calibration object data; and the at least one rule in the post-processing rule set is based on the calibration object data.

14. The computer-implemented method of claim 13, further comprising, during the calibration period:

evaluating, using the calibration object data, a rules data store comprising the plurality of possible rules to determine the at least one rule in the post-processing rule set, wherein the calibration object data includes at least one of:

an object class; and an object attribute.

15. The computer-implemented method of claim 12, further comprising, during the calibration period:

segmenting the field of view into a plurality of regions corresponding to the background setting; and determining, based on the calibration video data, a region identifier for each region of the plurality of regions, wherein:

the scene description parameters include at least one region identifier mapped to the at least one background object; and the at least one rule in the post-processing rule set is based on the detected object appearing in the region corresponding to the at least one region identifier.

16. The computer-implemented method of claim 12, further comprising, during the calibration period:

determining a plurality of time periods for the location, wherein the at least one rule in the post-processing rule set is based on at least one time period of the plurality of time periods.

17. The computer-implemented method of claim 12, further comprising, during the calibration period:

using at least one scene description parameter to index a selected rule template of a plurality of rule templates to determine the at least one rule in the post-processing rule set, wherein:

each rule template of the plurality of rule templates includes:

at least one selection index value; and at least one rule comparator field; and the at least one scene description parameter indicates the at least one selection index value of the selected rule template.

18. The computer-implemented method of claim 17, wherein the at least one rule comparator field for each rule template of the plurality of rule templates includes at least one of:

a region identifier value;

a time value;

an object class value;

an object attribute value; and a location condition value.

19. The computer-implemented method of claim 12, further comprising:

determining at least one location condition; and using the at least one location condition to post-process the surveillance object data to determine whether the detected object violates the at least one rule from the post-processing rule set.

20. A video camera, comprising:

a video image sensor configured to be positioned with a field of view of a location;

a processor;

a memory;

means for receiving, during a calibration period, calibration video data from the video image sensor;

means for determining, from the calibration video data and using a first set of object classes, at least one background object corresponding to a background setting of the field of view;

means for determining, based on the at least one background object, scene description parameters for the location;

means for determining, based on the scene description parameters and from a plurality of possible rules, a post-processing rule set for detected objects at the location, wherein:

the detected objects are a different object class than the at least one background object; and at least a portion of the plurality of possible rules are indexed to different scene description parameters;

means for receiving, during a surveillance period, surveillance video data from the video image sensor, wherein the surveillance video data is different than the calibration video data;

means for determining object data for a detected object in the surveillance video data;

means for post-processing, using the post-processing rule set, the object data to determine whether the detected object violates at least one rule from the post-processing rule set, wherein at least one rule in the post-processing rule set is configured to compare a value from the object data to a rule value indicating that a violation has occurred;

means for sending, responsive to no violation of the post-processing rule set occurring, an event notification for the detected object to a video surveillance application; and means for preventing, responsive to the detected object violating the at least one rule, the event notification.

* * * * *